(12) United States Patent
Watanabe et al.

(10) Patent No.: US 11,232,597 B2
(45) Date of Patent: Jan. 25, 2022

(54) INFORMATION SYSTEM AND IDENTIFICATION METHOD

(71) Applicant: Seiko Epson Corporation, Tokyo (JP)

(72) Inventors: Ryoki Watanabe, Matsumoto (JP); Hikaru Kurasawa, Shiojiri (JP); Naoki Kuwata, Shiojiri (JP); Masashi Kanai, Azumino (JP)

(73) Assignee: Seiko Epson Corporation

( * ) Notice: Subject to any disclaimer, the term of this patent is extended or adjusted under 35 U.S.C. 154(b) by 85 days.

(21) Appl. No.: 16/774,101

(22) Filed: Jan. 28, 2020

(65) Prior Publication Data
US 2020/0242808 A1 Jul. 30, 2020

(30) Foreign Application Priority Data
Jan. 29, 2019 (JP) .............................. JP2019-013572

(51) Int. Cl.
*G06T 7/90* (2017.01)
*G01J 3/28* (2006.01)
*G06Q 30/00* (2012.01)
*H04M 1/02* (2006.01)

(52) U.S. Cl.
CPC .............. *G06T 7/90* (2017.01); *G01J 3/2823* (2013.01); *G06Q 30/0185* (2013.01); *G01J 2003/2826* (2013.01); *G06T 2207/10024* (2013.01); *H04M 1/0264* (2013.01); *H04M 2250/52* (2013.01)

(58) Field of Classification Search
CPC .... G01J 2003/2826; G01J 3/0272; G01J 3/28; G01J 3/2823; G06K 9/00671; G06K 9/2018; G06T 2207/10024; G06T 7/90; G07D 7/1205; G07D 7/205
See application file for complete search history.

(56) References Cited

U.S. PATENT DOCUMENTS

| 6,363,366 B1* | 3/2002 | Henty ................ G01G 19/4144 382/110 |
| 2009/0326383 A1 | 12/2009 | Barnes et al. |
| 2015/0241563 A1* | 8/2015 | Veiga ...................... G01S 17/04 250/206.1 |
| 2015/0316473 A1* | 11/2015 | Kester ................... G01J 3/2803 250/339.02 |

(Continued)

FOREIGN PATENT DOCUMENTS

| JP | 2008-152713 A | 7/2008 |
| JP | 2017-203658 A | 11/2017 |

*Primary Examiner* — David Bilodeau
(74) *Attorney, Agent, or Firm* — Harness, Dickey & Pierce, P.L.C.

(57) ABSTRACT

An identification method for identifying a target to be measured includes accepting, from an input section, an information representing a condition for acquiring spectral information specific to a target to be measured, capturing, by a spectrometry camera, an image of the target, acquiring the spectral information specific to the target based on the captured image, and identifying the target based on (i) the spectral information and (ii) a database, stored in a memory, containing a plurality of pieces of spectral information corresponding to a plurality of objects. Acquiring the spectral information includes preferentially acquiring the spectral information specific to the target in a specific wavelength region where the target is identifiable.

15 Claims, 10 Drawing Sheets

(56) References Cited

U.S. PATENT DOCUMENTS

| | | | |
|---|---|---|---|
| 2016/0069743 A1* | 3/2016 | McQuilkin | G01J 3/0205 |
| | | | 356/416 |
| 2016/0231171 A1* | 8/2016 | Assefa | G01J 3/0272 |
| 2017/0195586 A1* | 7/2017 | Borremans | G01C 3/08 |
| 2018/0295355 A1* | 10/2018 | Flanagan | G06K 9/2063 |
| 2019/0371056 A1* | 12/2019 | Wetzel | G01S 17/89 |
| 2020/0111053 A1* | 4/2020 | Bogolea | G06K 9/00664 |

* cited by examiner

INFORMATION SYSTEM AND IDENTIFICATION METHOD

The present application is based on, and claims priority from, JP Application Serial Number 2019-013572, filed Jan. 29, 2019, the disclosure of which is hereby incorporated by reference herein in its entirety.

BACKGROUND

1. Technical Field

The present disclosure relates to an information system and an identification method.

2. Related Art

In recent years, as a function provided by application software and the like provided in an information terminal, such as a smartphone, there is a known electronic picture book that identifies the type of a measurement target based on an image thereof captured with a camera, the measurement target including animals, such as fish and shellfish, insects, and mammals, and plants such as flowers and trees.

For example, JP-A-2008-152713 discloses an invention of an electronic picture book that identifies the type of a flower as the measurement target. In JP-A-2008-152713, "the color, the number, and the shape of petals and how the flower cluster is formed" as characteristic quantities of the flower, "the shape of leaves, the contour of the leaves, and hairs and prickles of the stem" as characteristic quantities of the leaves, and other factors are extracted from the acquired image of the flower, and the type of the flower is identified based on the characteristic quantities, that is, the type of the flower is identified based on the characteristic quantities, such as the shape of the flower and the size of the shape.

In the electronic picture book described above, however, when the measurement target in the captured image, for example, "resembles the background pattern," "is oriented in a direction different from the direction that indicates the shape for identifying the flower," or "extends off an image capturing area," it is difficult to recognize the measurement target, and the type of the measurement target cannot be undesirably identified.

The problem described above results from the fact that the identification of the type of a measurement target, such as a flower, uses characteristic quantities, such as the shape of the measurement target and the size of the shape as described above, and the "shape" cannot be cut off when the measurement target "resembles the background pattern," or the shape of the measurement target differs from any of the "shapes" saved in a database provided in the electronic picture book when the measurement target "faces frontward or rearward" or "extends off the image capturing area." That is, the problem described above results from a difficulty in extracting characteristic quantities necessary for the identification of the type of the measurement target and based on the shape of the measurement target.

In addition to the electronic picture book described above, there is a proposed detection method for evaluating whether a measurement target as an inspection target object is good or bad (see JP-A-2017-203658, for example). In the detection method, the evaluation of whether or not the measurement target is good is performed based on spectral information (spectral data) obtained by capturing an image of the measurement target.

It is therefore believed that the type of a measurement target can be identified in an electronic picture book by using spectral information obtained by capturing an image of the measurement target as information for extracting characteristic quantities for identifying the type of the measurement target, that is, using a color tone specific to the measurement target as a characteristic quantity even when it is difficult to extract characteristic quantities based on the shape of the measurement target as described above.

However, when the spectral information obtained by capturing an image of the measurement target is applied to an electronic picture book that identifies the type of the measurement target, and the wavelength region over which the spectral information is acquired is set, for example, to be the entire visible light region (from about 400 to 760 nm), it is believed that it undesirably take time to acquire the spectral information over the entire region.

It is further expected that the problem described above is not limited to an electronic picture book that identifies the type of animal and a plant as a measurement target but also occurs in a detection method for detecting the presence or absence of an animal or a plant as a target the presence of which is desired to be identified in a captured image and detecting the position where the animal or the plant is present, an authentication method for authenticating the genuineness of an article, such as a bag, a purse, a timepiece, and a jewel, as a measurement target in a captured image and assessing the degree of degradation of the article over time.

SUMMARY

The present disclosure can be implemented as the following application examples.

According to an application example of the present disclosure, an identification method for identifying a target to be measured includes accepting, from an input section, an information representing a condition for acquiring spectral information specific to a target to be measured, capturing, by a spectrometry camera, an image of the target, acquiring the spectral information specific to the target based on the captured image, and identifying the target based on (i) the spectral information and (ii) a database, stored in a memory, containing a plurality of pieces of spectral information corresponding to a plurality of objects. Acquiring the spectral information includes preferentially acquiring the spectral information specific to the target in a specific wavelength region where the target is identifiable. Another application example of the present disclosure includes a non-transitory computer readable medium that embodies instructions that cause one or more processors to perform the method described above. Still another application example of the present disclosure includes an information system for the method described above.

DESCRIPTION OF EXEMPLARY EMBODIMENTS

An information system and an identification method according to the present disclosure will be described below in detail based on preferable embodiments shown in the accompanying drawings.

Information System

First Embodiment

Figure 1:
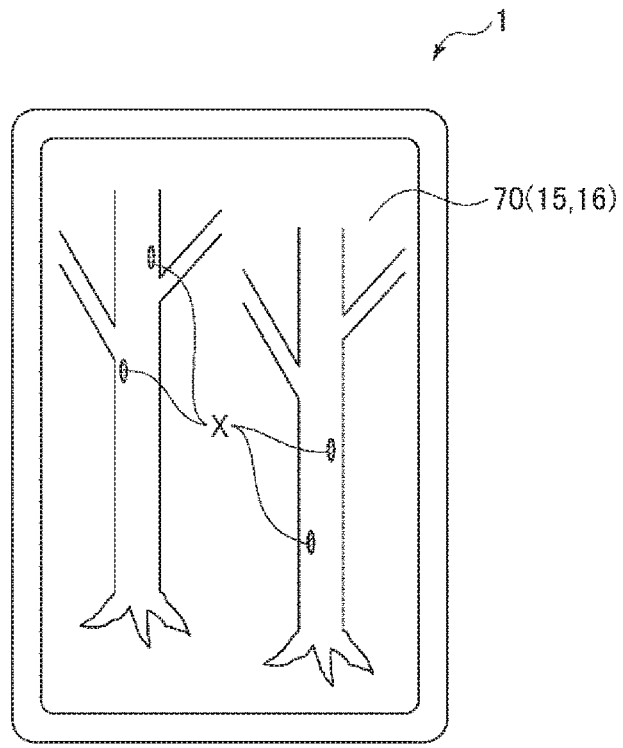
FIG. 1 is a plan view showing the front side of the entire appearance of a smartphone that is an information terminal to which a first embodiment of an information system according to the present disclosure is applied.
Figure 2:
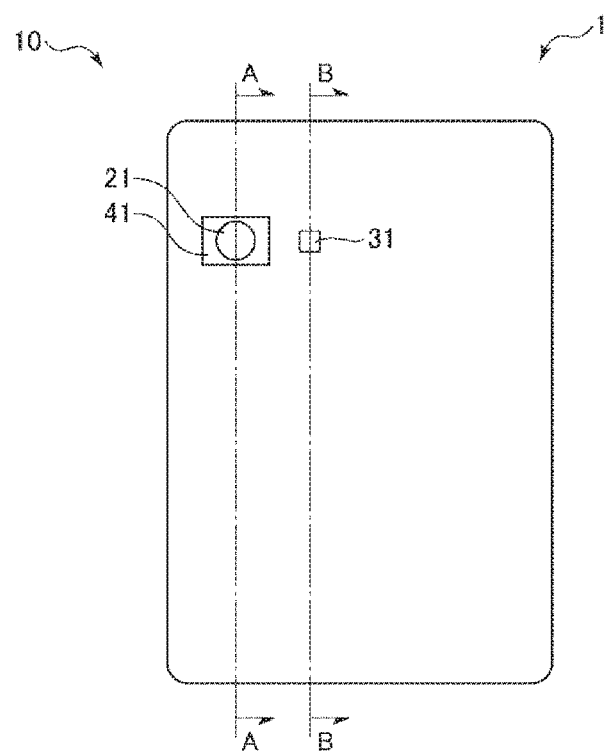
FIG. 2 is a plan view showing the rear side of the entire appearance of the smartphone that is the information terminal to which the first embodiment of the information system according to the present disclosure is applied.
Figure 3:
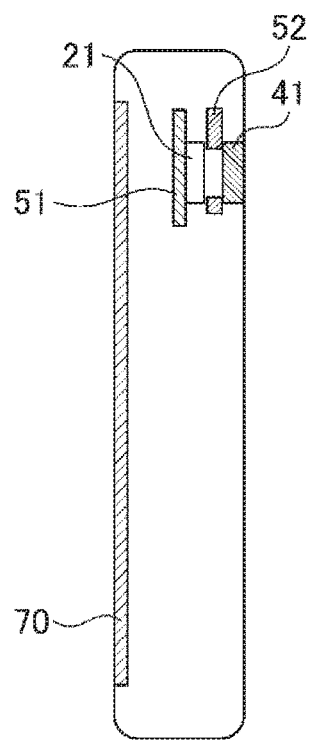
FIG. 3 is a cross-sectional view of the smartphone shown in FIG. 2 taken along the line A-A.
Figure 4:
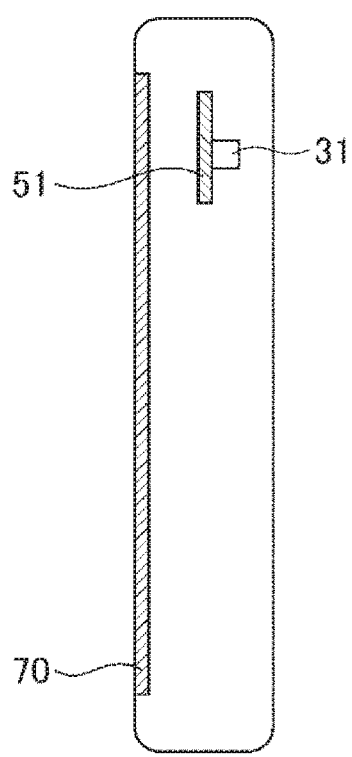
FIG. 4 is a cross-sectional view of the smartphone shown in FIG. 2 taken along the line B-B.
Figure 5:
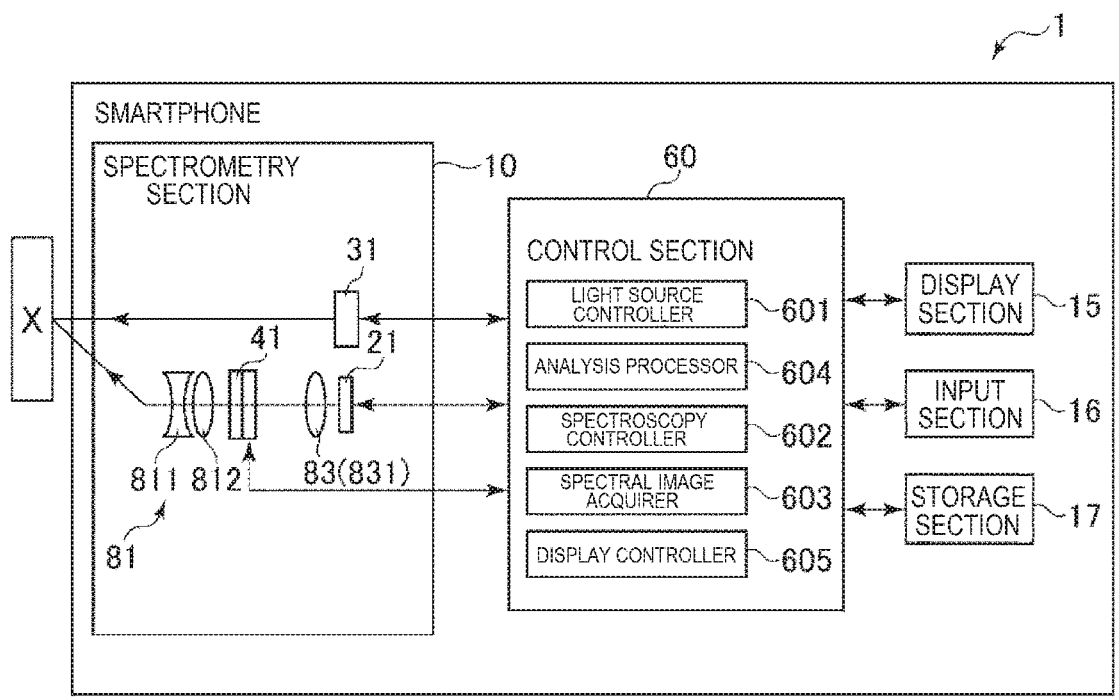
FIG. 5 is a block diagram showing a schematic configuration of the smartphone shown in FIGS. 1 and 2.
Figure 6:
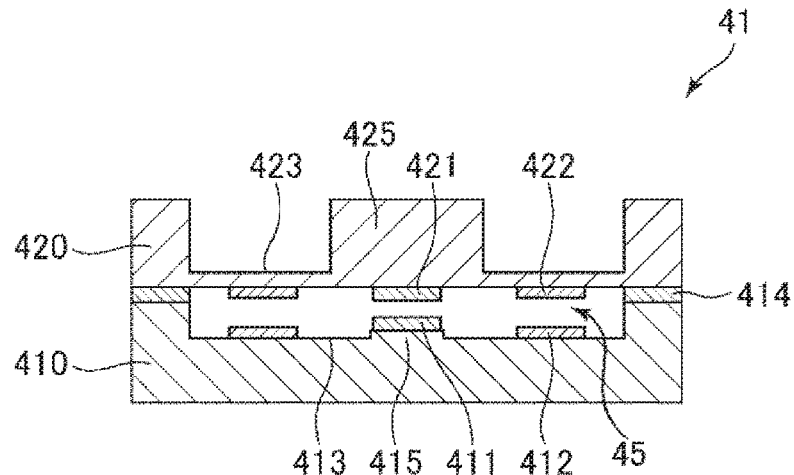
FIG. 6 is a longitudinal cross-sectional view showing an example in which a Fabry-Perot etalon filter is used as a wavelength variable interference filter provided in a spectroscopy section provided in a spectrometry section of the smartphone shown in FIGS. 1 and 2.
Figure 7:
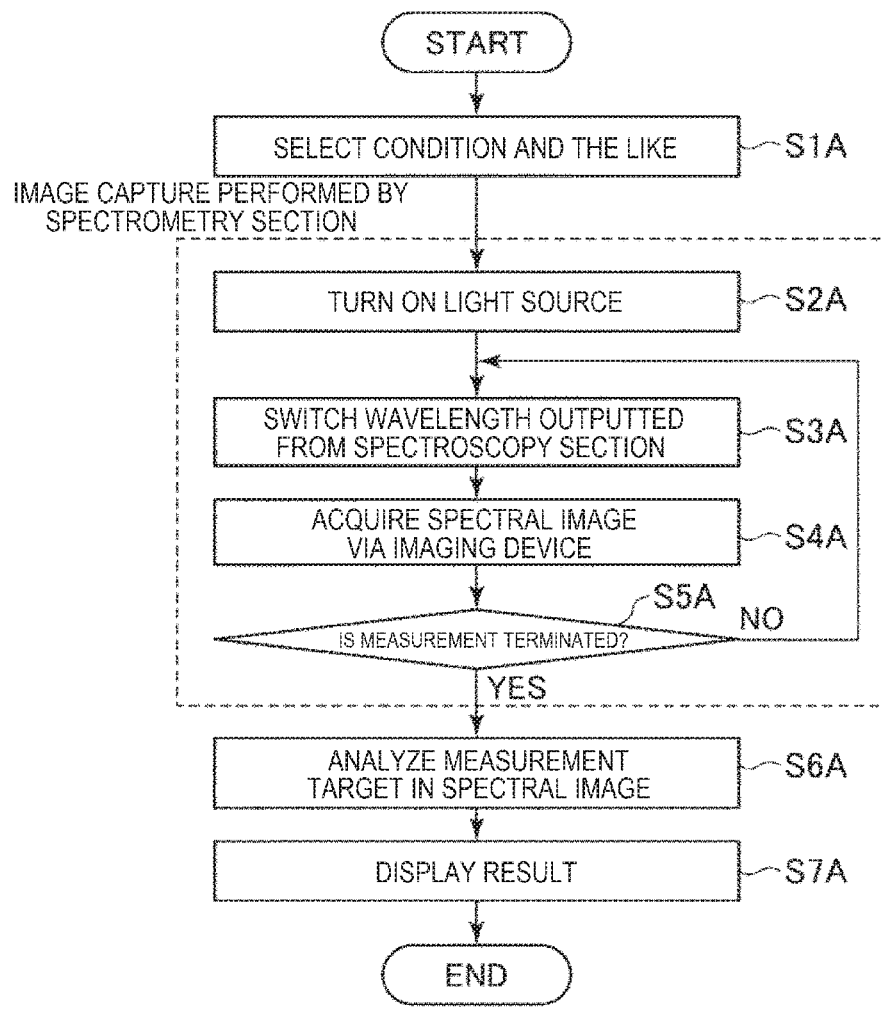
FIG. 7 is a flowchart showing an identification method for identifying the type of a measurement target by using the smartphone shown in FIGS. 1 and 2.
Figure 8:
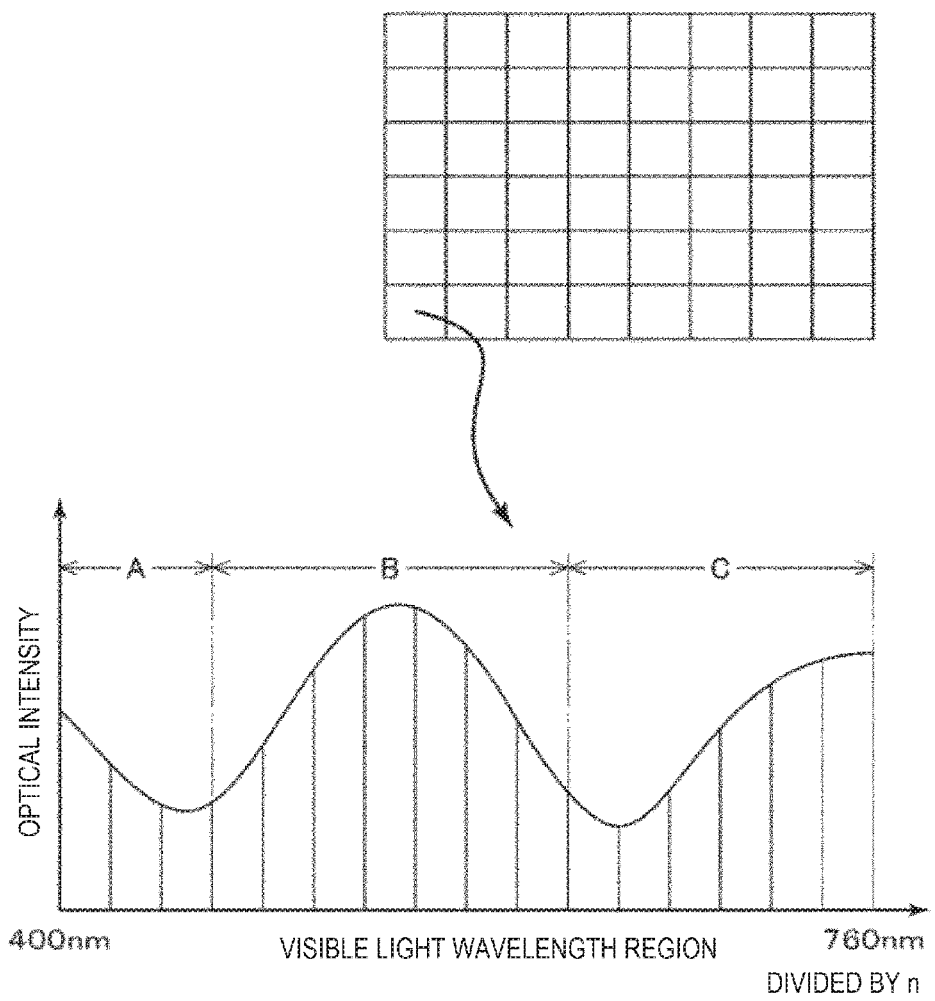
FIG. 8 is a schematic view for describing spectral information specific to the measurement target obtained by causing the smartphone shown in FIGS. 1 and 2 to capture an image of the measurement target.
Figure 9:
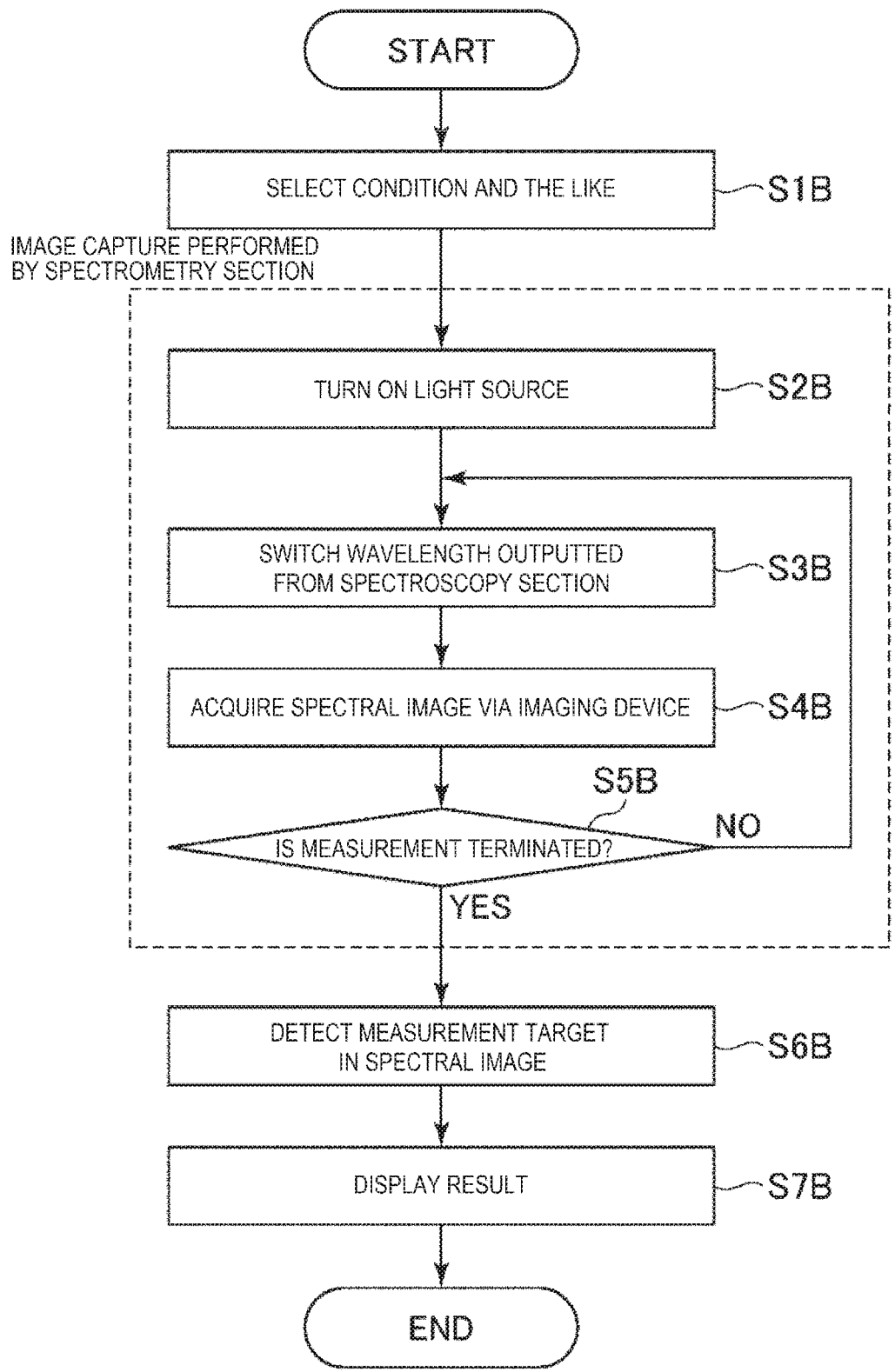
FIG. 9 is a flowchart showing a detection method for detecting a measurement target by using the smartphone shown in FIGS. 1 and 2.
Figure 10:
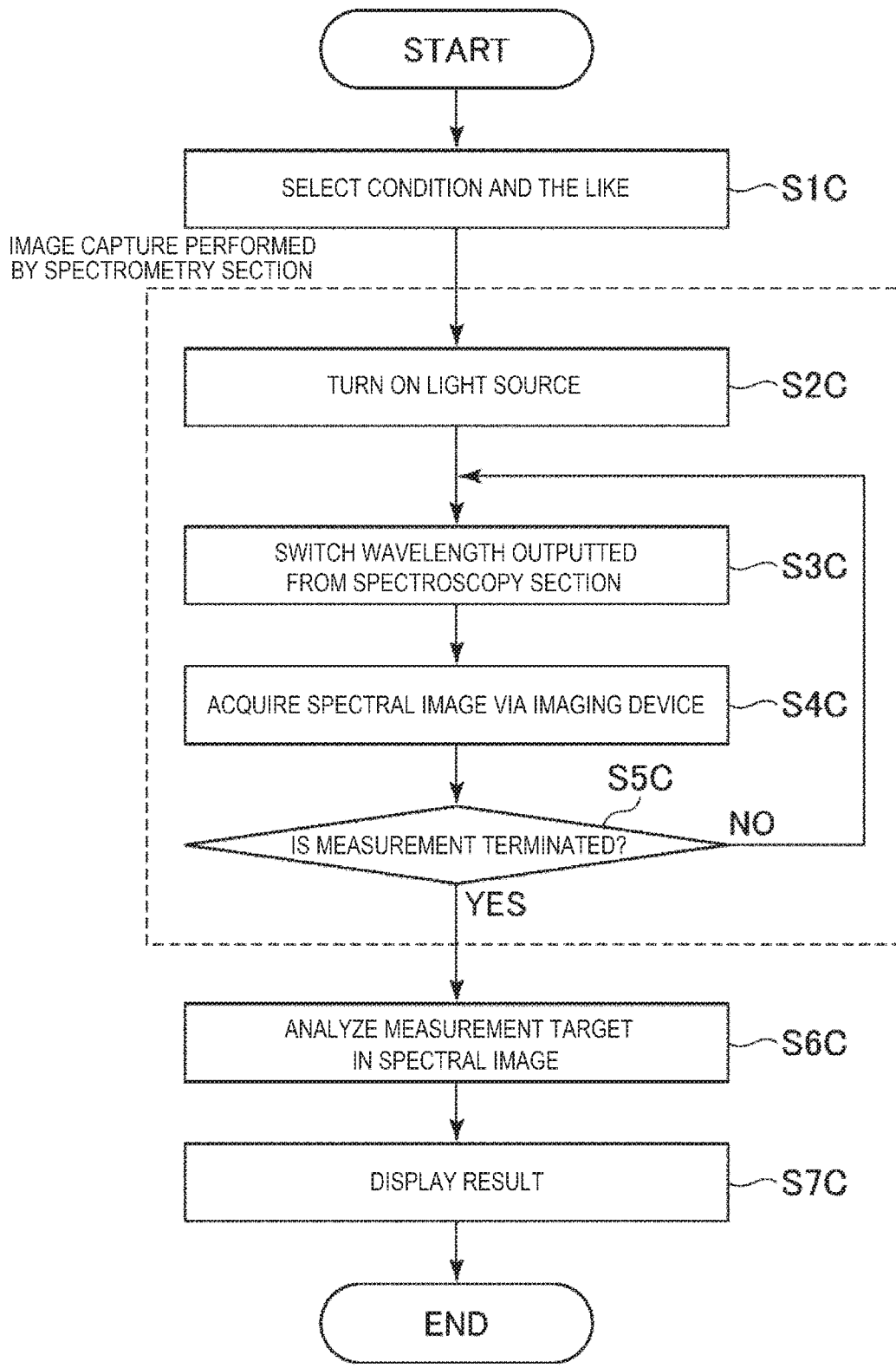
FIG. 10 is a flowchart showing an authentication method for authenticating a measurement target by using the smartphone shown in FIGS. 1 and 2.

FIG. 1 is a plan view showing the front side of the entire appearance of a smartphone that is an information terminal to which a first embodiment of an information system according to the present disclosure is applied. FIG. 2 is a plan view showing the rear side of the entire appearance of the smartphone that is the information terminal to which the first embodiment of the information system according to the present disclosure is applied. FIG. 3 is a cross-sectional view of the smartphone shown in FIG. 2 taken along the line A-A. FIG. 4 is a cross-sectional view of the smartphone shown in FIG. 2 taken along the line B-B. FIG. 5 is a block diagram showing a schematic configuration of the smartphone shown in FIGS. 1 and 2. FIG. 6 is a longitudinal cross-sectional view showing an example in which a Fabry-Perot etalon filter is used as a wavelength variable interference filter provided in a spectroscopy section provided in a spectrometry section of the smartphone shown in FIG. 2. FIG. 7 is a flowchart showing an identification method for identifying the type of a measurement target by using the smartphone shown in FIG. 2. FIG. 8 is a schematic view for describing spectral information specific to a measurement target and obtained by causing the smartphone shown in FIGS. 1 and 2 to capture an image of the measurement target. FIG. 9 is a flowchart showing a detection method for detecting a measurement target by using the smartphone shown in FIGS. 1 and 2. FIG. 10 is a flowchart showing an authentication method for authenticating a measurement target by using the smartphone shown in FIGS. 1 and 2.

The present embodiment will be described below with reference to a case where a smartphone 1 (SP), which is one type of an information terminal, is used as the information system according to the present disclosure, that is, a case where the smartphone 1, which is an information terminal, by itself completes the information system according to the present disclosure.

The smartphone 1 is one type of a mobile information terminal having an imaging function and includes an input section 16, via which a condition for acquiring spectral information associated with a measurement target X (target) to be measured is inputted, a spectrometry section 10, which acquires the spectral information specific to the measurement target X, a control section 60, which serves as a spectrometry section controller that controls the action of the spectrometry section 10, and a storage section 17, which stores a database containing a plurality of pieces of spectral information including the spectral information specific to the measurement target X, as shown in FIGS. 1 to 5.

In the smartphone 1, the spectrometry section 10 preferentially acquires the spectral information specific to the measurement target X under the control of the control section 60 in a specific wavelength region where the measurement target X can be identified.

As described above, in the smartphone 1, the spectral information specific to the measurement target X is preferentially acquired in the specific wavelength region where the measurement target X can be identified. The spectral information can therefore be acquired in a short period, as described above, as compared, for example, with a case where the spectral information is acquired over the entire visible light region (from about 400 to 760 nm), and the measurement target X can be identified with excellent identification accuracy.

The specific wavelength region where the spectral information specific to measurement target X is to be preferentially acquired to allow the smartphone 1 to identify the measurement target X is not necessarily selected from the visible light region and may be selected form the infrared region, the ultraviolet region, or any other region.

When an electronic picture book that identifies the type of an animal, a plant, or the like as the measurement target X is activated as application software provided in the smartphone 1, a display section 15 displays the type of an identified animal, plant, or the like and further displays detailed information thereon and other pieces of information. In the method, the smartphone 1 can therefore identify the type in a short period with excellent accuracy.

When a detection method for detecting the presence or absence and the position of an animal, a plant, or the like as the measurement target X in a captured image, that is, an image capturing area is activated as the application software described above, the display section 15 displays the type of a detected animal, plant, or the like and the position where the animal, the plant, or the like is present and further displays the probability of the presence thereof and other types of information. In the method, the smartphone 1 can detect the animal, the plant, or the like in a short period with excellent detection accuracy. In FIG. 1, the display section 15 displays insects, such as beetles and stag beetles, as the measurement target X with the on-tree positions of the insects identified.

When an authentication method for authenticating the genuineness (authenticity) of an article, such as a bag, a purse, a timepiece, and a jewel, as the measurement target X in a captured image and assessing the degree of degradation of the article over time is activated as the application software described above, the display section displays the genuineness of an identified, that is, authenticated article and the degree of degradation of the article over time and further displays the authenticity rate, the position where degradation over time occurs, and other pieces of information. In the method, the smartphone 1 can authenticate the article in a short period with excellent authentication accuracy.

Each of the configurations of the sections provided in the smartphone 1 according to the present embodiment will be described below.

Display Section 15 and Input Section 16

In the smartphone 1, a display 70 has both the functions of the display section 15 and the input section 16, and the display section 15 is formed, for example, of any of a variety of display devices, such as a liquid crystal display and an organic EL display. The display section 15 is provided on the front side of the smartphone 1 and displays a variety of visualizing images containing information on the identified measurement target X, as shown in FIG. 1. In the present disclosure, the display section 15 and the input section 16 may be so provided as to be separate sections.

Examples of the visualizing images, that is, the information on the identified measurement target X displayed on the display section 15 may include an image of the identified measurement target X and information on the characteristics, category, constituent components, properties, and other factors of the measurement target X and may further include the presence or absence and the position of the measurement target X in an image capturing area, the accuracy (%) at which the measurement target X has been recognized, the probability (%) of the presence of the measurement target X, the probability (%) of the genuineness of the measurement target X, and the degree (%) of degradation of the measurement target X.

The input section 16 is provided, for example, on the surface of the display section 15, is formed of a touch panel including a touch sensitive surface and a sensor for detecting the magnitude of contact with the touch sensitive surface, and accepts a user's (operator's) operation instruction, that is, a condition for acquiring spectral information specific to the measurement target X and the like when the operation instruction is inputted.

Storage Section 17

The storage section 17 is formed of any of a variety of storage devices (memories), such as a ROM and a RAM, and stores a variety of data, programs, and other pieces of information necessary for the control of the smartphone 1, particularly, the control of the spectrometry section 10.

Examples of the data may include application software, a program, and the like for achieving the functions of the control section 60 and may further include correlation data or the V-X data representing the relationship between drive voltage applied to an electrostatic actuator 45 provided in a Fabry-Perot etalon filter in a spectroscopy section 41 and the wavelength of light that passes through the Fabry-Perot etalon filter and a database for identifying, for example, the type of the measurement target X based on the spectral information specific to the measurement target X. The database used herein refers to spectral information associated with each of animals, such as fish and shellfish, insects, and mammals, plants, such as flowers and trees, articles, such as bags, purses, timepieces, and jewels, and other objects including the measurement target X to be identified and also includes information on the specific wavelength region where the measurement target X can be identified.

Spectrometry section 10

The spectrometry section 10 is what is a spectroscopic camera that acquires an spectral image, that is, spectral information by receiving reflected light reflected off the measurement target X and spectrally separating the reflected light to provide light that has a selected specific wavelength or belongs to a selected specific wavelength region (the following description will be made by representatively using the "specific wavelength") and then capturing an image of the light having the specific wavelength.

In the present embodiment, the spectrometry section 10 includes a light source 31, which irradiates the measurement target X, that is an imaging target with light, an imaging device 21, which captures an image based on reflected light reflected off the measurement target X, and a spectroscopy section 41, which can selectively output light having a predetermined wavelength from the light incident on the spectroscopy section 41 and can change the wavelength of the output light to be outputted or the wavelength region to which the output light belongs.

In the thus configured spectrometry section 10, the spectroscopy section 41 is disposed between the imaging device 21 and the measurement target X with the light source 31 and the imaging device 21 so disposed on the rear surface of the smartphone 1 as to be oriented in the same direction, as shown in FIG. 2. Arranging the light source 31, the spectroscopy section 41, and the imaging device 21 in the positional relationship described above allows the light source 31, the spectroscopy section 41, and the imaging device 21 to configure the spectrometry section 10 in the form of a spectroscopic camera based on post-stage spectroscopic method. The spectroscopic camera based on post-stage spectroscopic method can acquire a specific wavelength and the shape of a spectrum by scanning the wavelengths over a certain measurement range (predetermined area) to grasp the characteristics of the measurement target X. The post-stage spectroscopic method is therefore effective when a measurement target X that is unknown in terms of specific wavelength is measured, that is, imaged.

The spectrometry section 10 may instead be formed of a spectroscopic camera based on pre-stage spectroscopic method with the spectroscopy section 41 disposed between the light source 31 and the measurement target X. The thus configured spectroscopic camera based on a pre-stage spectroscopic method uses a method that allows the characteristics of the measurement target X to be grasped by irradiating the measurement target X with light having a specific wavelength. The pre-stage spectroscopic method is therefore effective when a measurement target X known in terms of specific wavelength is measured and allows a decrease in the amount of information on the result of the measurement as compared with the post-stage spectroscopic method for an advantage of a decrease in measurement period.

The configurations of the sections provided in the spectrometry section 10 will each be described below.

Light Source 31

The light source 31 is an optical device that radiates illumination light toward the measurement target X.

The light source 31 is so disposed on a circuit substrate 51, which is disposed in an enclosure of the smartphone 1, on the rear surface of the smartphone 1 as to be capable of radiating the illumination light toward the measurement target X, as shown in FIGS. 2 and 4.

No spectroscopy section is disposed between the light source 31 and the measurement target X, so that the measurement target X is directly irradiated with the light outputted from the light source 31.

Examples of the thus configured light source 31 may include an LED light source, an OLED light source, a xenon lamp, and a halogen lamp. A preferable example of the light source 31 is a light source that provides high optical intensity over the entire wavelength region over which the spectroscopy section 41, which is formed of a wavelength variable interference filter, performs spectrometry, that is, a light source capable of radiating white light that is intense over the entire visible light region. The light source 31 may include, for example, a light source capable of radiating light having a predetermined wavelength, such as infrared light, in place of a white-light light source.

Imaging Device 21

The imaging device 21 functions as a detector that captures an image based on reflected light reflected off the measurement target X to detect the reflected light reflected off the measurement target X.

The imaging device 21 is so disposed on the circuit substrate 51, which is disposed in the enclosure of the smartphone 1, on the rear surface of the smartphone 1 as to be capable of receiving the reflected light reflected off the measurement target X, as shown in FIGS. 2 and 3.

The spectroscopy section 41 is disposed between the imaging device 21 and the measurement target X. The spectroscopy section 41 selectively outputs light having a specific wavelength out of the incident light incident from the measurement target X on the spectroscopy section 41, and the imaging device 21 captures the output light as a spectral image, that is, spectral information.

The thus configured imaging device 21 is formed, for example, of a CCD or a CMOS device.

Spectroscopy Section 41

The spectroscopy section 41 can selectively output light having a spectrally separated wavelength that is the specific wavelength from the light incident on the spectroscopy section 41 and can change the wavelength region to which the output light to be outputted belongs. That is, the spectroscopy section 41 outputs the light having the specific wavelength as output light from the incident light toward the imaging device 21.

The spectroscopy section 41 is disposed on a circuit substrate 52 disposed in the enclosure of the smartphone 1, as shown in FIG. 3.

The spectroscopy section 41 is disposed between the imaging device 21 and the measurement target X, that is, in the optical axis therebetween. The thus disposed spectroscopy section 41 selectively outputs the output light having the specific wavelength out of the incident light incident from the measurement target X on the spectroscopy section 41 toward the imaging device 21.

The thus configured spectroscopy section 41 is formed of a wavelength variable interference filter so that the wavelength region to which the output light to be outputted belongs is changeable. The wavelength variable interference filter is not limited to a specific type and may, for example, be a wavelength-variable Fabry-Perot etalon filter, an acousto-optical tunable filter (AOTF), a linear variable filter (LVF), or a liquid crystal tunable filter (LCTF), in each of which an electrostatic actuator adjusts the size of the gap between two filters (mirrors) to control the wavelength of the reflected light that passes through the filter. Among the filters described above, the wavelength variable interference filter is preferably a Fabry-Perot etalon filter.

A Fabry-Perot etalon filter uses multiple interference that occurs between the two filters to extract reflected light having a desired wavelength. The spectroscopy section 41 can therefore be extremely thin, specifically, the thickness of the spectroscopy section 41 can be set at a value smaller than or equal to 2.0 mm. Therefore, the spectroscopy section 41 and in its turn the smartphone 1 including the spectrometry section 10 can be more compact. Using a Fabry-Perot etalon filter as the wavelength variable filter therefore allows further reduction in size of the spectrometry section 10.

The spectroscopy section 41 using a wavelength-variable Fabry-Perot etalon filter as the wavelength variable interference filter will be described below with reference to FIG. 6.

The Fabry-Perot etalon filter is an optical member having a rectangular-plate-like shape in the plan view and includes a fixed substrate 410, a movable substrate 420, a fixed reflection film 411, a movable reflection film 421, a fixed electrode 412, a movable electrode 422, and a bonding film 414. The fixed substrate 410 and the movable substrate 420 are integrally bonded to each other via the bonding film 414 with the fixed substrate 410 and the movable substrate 420 layered on each other.

The fixed substrate 410 has a groove 413 so formed in an etching process carried out in the thickness direction of the fixed substrate 410 as to surround a central portion of the fixed substrate 410 so that a reflection film placement section 415 is formed in the central portion. On the thus configured fixed substrate 410, a fixed optical mirror formed of the fixed reflection film 411 is provided on a side of the reflection film placement section 415 that is the side facing the movable substrate 420, and the fixed electrode 412 is provided on a side of the groove 413 that is the side facing the movable substrate 420.

The movable substrate 420 has a holding portion that is a groove 423 so formed in an etching process carried out in the thickness direction of the movable substrate 420 as to surround a central portion of the movable substrate 420 so that a movable portion that is a reflection film placement section 425 is formed in the central portion. On the thus configured movable substrate 420, a movable optical mirror formed of the movable reflection film 421 is provided on a side of the reflection film placement section 425 that is the side facing the fixed substrate 410, that is, the lower side of the movable substrate 420, and the movable electrode 422 is provided on a side of the movable substrate 420 that is the side facing the fixed substrate 410.

A portion of the movable substrate 420 that is the portion corresponding to the groove 423 is so formed as to be thinner than the reflection film placement section 425, so that the portion corresponding to the groove 423 functions as a diaphragm that is deformed by electrostatic attraction force produced when voltage is applied to the space between the fixed electrode 412 and the movable electrode 422.

The fixed substrate 410 and the movable substrate 420 can be produced as long as they each have a thickness greater than or equal to 0.1 mm but smaller than or equal to 1.0 mm.

The thickness of the overall Fabry-Perot etalon filter can therefore be set at a value smaller than or equal to 2.0 mm, whereby the size of the spectrometry section 10 can be reduced.

Between the thus configured fixed substrate 410 and movable substrate 420, the fixed reflection film 411 and the movable reflection film 421 are so disposed in a substantially central portion of the fixed substrate 410 and the movable substrate 420 as to face each other via a gap. Further, the fixed electrode 412 and the movable electrode 422 are so disposed in the respective grooves that surround the respective central portions described above as to face each other via a gap. Among the components described above, the fixed electrode 412 and the movable electrode 422 form the electrostatic actuator 45, which adjusts the size of the gap between the fixed reflection film 411 and the movable reflection film 421.

The electrostatic attraction force produced when voltage is applied to the space between the fixed electrode 412 and the movable electrode 422, which form the electrostatic actuator 45, deforms the holding portion, which is the groove 423. As a result, the size of the gap, that is, the distance between the fixed reflection film 411 and the movable reflection film 421 can be changed. Setting the size of the gap as appropriate allows selection of the wavelength of the light passing through the Fabry-Perot etalon filter and selective output of light having a desired wavelength (light that belongs to desired wavelength region) from the incident light. Further, changing the configuration of the fixed reflection film 411 and the movable reflection film 421 allows control of the full width half maximum of the spectrum of the light passing through the Fabry-Perot etalon filter, that is, the resolution of the Fabry-Perot etalon filter.

The fixed substrate 410 and the movable substrate 420 are each made, for example, of any of a variety of glass materials, such as soda glass, crystalline glass, quartz glass, lead glass, potassium glass, borosilicate glass, and alkali-free glass, or crystal quartz. The bonding film 414 is formed, for example, of a plasma polymerization film made primarily of siloxane. The fixed reflection film 411 and the movable reflection film 421 are each formed, for example, of a metal film made, for example, of Ag, an alloy film made, for example, of an Ag alloy, or a dielectric multilayer film including a $TiO_2$ layer as a high refraction layer and an $SiO_2$ layer as a low refraction layer. The fixed electrode 412 and the movable electrode 422 are each made of any of a variety of electrically conductive materials.

Optical Systems 81 and 83

The spectrometry section 10 in the present embodiment includes optical systems 81 and 83 each formed of a variety of optical parts, as shown in FIG. 5.

A first spectroscopy-section-side optical system is disposed between the measurement target X and the spectroscopy section 41, includes a light incident lens 811 as a light incident optical system and a projection lens 812, and guides the reflected light reflected off the measurement target X to the spectroscopy section 41.

A first imaging-device-side optical system 83 is disposed between the spectroscopy section 41 and the imaging device 21, includes a light incident/exiting lens 831, and guides the output light outputted from the spectroscopy section 41 to the imaging device 21.

The configuration in which the spectrometry section 10 includes at least one of the thus configured optical systems 81 and 83 allows improvement in light collection factor at which the imaging device 21 collects the reflected light reflected off the measurement target X.

At least one of the optical systems 81 and 83 may be omitted in consideration of the light collection factor described above, at which the imaging device 21 collects the reflected light.

The first spectroscopy-section-side optical system 81 may be disposed between the spectroscopy section 41 and the first imaging-device-side optical system 83 in place of the arrangement described above (see FIG. 5).

Control Section 60

The control section 60 is formed, for example, of a processor that is provided in the enclosure with which the smartphone 1 is provided and is the combination of a CPU, a memory, and other components, and the control section 60 controls the action of each section of the spectrometry section 10, such as the light source 31, the imaging device 21, and the spectroscopy section 41, that is, the action of the spectrometry section 10 as a whole or each section thereof and controls the action of the display section 15 and input/output of data to and from the storage section 17. From the viewpoint of controlling the action of the spectrometry section 10, it can be said that the control section 60 corresponds to or includes the "spectrometry section controller."

More specifically, the control section 60 reads software, such as a program, stored in the storage section to control the actions of the light source 31, the spectroscopy section 41, and the imaging device 21 based on the user's operation instruction inputted to the input section 16, that is, a condition for acquiring the spectral information specific to the measurement target X. Based on the resultant spectral image, that is, the spectral information, the control section 60 then, for example, identifies the imaged measurement target X and displays the type and characteristics of the target measurement target X, the presence or absence of the measurement target X in the image capturing area, and other pieces of information on the display section 15.

The control section 60 includes a light source controller 601, a spectroscopy controller 602, a spectral image acquirer 603, an analysis processor 604, and a display controller 605 in the present embodiment, as shown in FIG. 5.

The light source controller 601 controls turning on and off the light source 31 based on the user's operation instruction inputted to the input section 16, specifically, a condition for acquiring the spectral information specific to the measurement target X.

The spectroscopy controller 602 acquires a voltage value (input value) of the drive voltage corresponding to the spectrally separated wavelength, that is, the specific wavelength to be outputted based on the V-λ data stored in the storage section 17. The spectroscopy controller 602 then outputs an instruction signal that applies the acquired voltage value to the electrostatic actuator 45 of the Fabry-Perot etalon filter as the spectroscopy section 41. That is, the spectroscopy controller 602 controls the action of the spectroscopy section 41 to identify the value of the specific wavelength of the light outputted from the spectroscopy section 41. Further, the spectroscopy controller 602, for example, evaluates whether measurement wavelength change timing is detected, the measurement wavelength is changed, the drive voltage is changed in accordance with the change in the measurement wavelength, and the measurement is terminated based on a variety of data stored in the storage section 17 and outputs an instruction signal based on the result of the evaluation.

The spectral image acquirer 603 causes the imaging device 21 to acquire light quantity measurement data (amount of received light) as the spectral image (capture spectral image), that is, the spectral information based on the reflected light reflected off the measurement target X and then stores the acquired spectral image in the storage section 17. The spectral image acquirer 603 also stores the measurement wavelength at which the spectral image has been acquired in the storage section 17 along with the spectral image when storing the spectral image in the storage section 17.

The analysis processor 604 acquires the spectral image of the measurement target X and the measurement wavelength at which the measurement target X is measured, that is, an optical spectrum stored in the storage section 17 as the spectral information and analyzes the spectral information. That is, the analysis processor 604 performs spectroscopic process of comparing the optical spectrum as the spectral information with the database stored in the storage section 17 to identify the imaged measurement target X.

The acquisition of the spectral image and the measurement wavelength performed by the analysis processor 604 can be directly performed by the spectral image acquirer 603 with no intervention of the storage section 17.

The display controller 605 causes the display section 15 to display information on the measurement target X identified by the analysis processor 604 as a visualizing image.

In the thus configured control section 60, the light source controller 601, the spectroscopy controller 602, and the spectral image acquirer 603 form a spectrometry section controller that controls the actions of the light source 31, the spectroscopy section 41, and the imaging device 21, that is, the action of the spectrometry section 10.

In the thus configured smartphone 1, selecting the type of application software to be activated, that is, selecting a method for using the smartphone 1 allows the smartphone 1 to be used as 1) an electronic picture book that identifies the type of an animal, a plant, or the like as the measurement target X, 2) a detector that detects the presence or absence of an animal, a plant, or the like as the measurement target X in a captured image and the position where the animal, the plant, or the like is present, and further 3) an authenticator that authenticates the genuineness (authenticity) of an article as the measurement target X in a captured image and the degree of degradation of the article over time. A description will be made of a method for using the smartphone 1 as apparatuses for achieving 1) to 3).

1) Method for Using Smartphone as Electronic Picture Book

An identification method for identifying the type of an animal, a plant, or the like as the measurement target X by using the smartphone 1 described above as an electronic picture book will be described below in detail with reference to FIG. 7 and other figures.

In the identification method using the smartphone 1 as an electronic picture book, the spectrometry section 10 is used to capture an image of the measurement target X, and the measurement target X is identified based on the captured spectral image. The image, type, detailed description, and other factors of the identified measurement target X are then displayed on the display 70.

<1A> The user first operates the input section 16 to activate application software that uses the smartphone 1 as an electronic picture book and then selects a condition and other factors as required in accordance with an instruction issued by the application software (S1A).

Examples of the condition inputted in accordance with the instruction issued by the application software may include the category, that is, the group of the measurement target X, such as flowers, fish, and mammals. Inputting the category of the measurement target X in advance as described above allows the smartphone 1 to quickly detect the measurement target X. The quick detection performed by the smartphone 1 will be described later in detail.

<2A> The user then operates the input section 16 to issue an input instruction that instructs the smartphone 1, that is, the spectrometry section 10 to capture an image of the measurement target X, and the control section 60 controls the action of the spectrometry section 10 based on the input instruction to capture an image of the measurement target X at the specific wavelength.

<2A-1> The light source controller 601 first turns on the light source 31 in accordance with the user's input instruction performed on the input section 16 and representing capture of an image of the measurement target X (S2A).

When the light source 31 is turned on, the measurement target X is irradiated with the illumination light outputted from the light source 31. The radiated light is then reflected off the measurement target X, and the reflected light enters as incident light the spectroscopy section 41.

<2A-2> The spectroscopy controller 602 then acquires a voltage value (input value) of the drive voltage corresponding to the spectrally separated wavelength, that is, the specific wavelength to be outputted based on the V-λ data stored in the storage section 17. The spectroscopy controller 602 then outputs an instruction signal that applies the acquired voltage value to the electrostatic actuator 45 of the Fabry-Perot etalon filter as the spectroscopy section 41 (S3A).

As a result, out of the light incident as the incident light from the measurement target X on the spectroscopy section 41, the light having the specific wavelength is selectively outputted as the output light toward the imaging device 21.

Before the spectroscopy section 41 outputs the light having the specific wavelength, the spectroscopy controller 602 preferably performs adjustment or calibration of the spectroscopy section 41. An optical spectrum $s_{ref}$ associated with the light source 31 is thus acquired.

<2A-3> The spectral image acquirer 603 then controls the action of the imaging device 21 to cause the imaging device 21 to acquire the light having the specific wavelength outputted as the output light from the spectroscopy section 41 as the spectral image. That is, out of the reflected light reflected off the measurement target X, the spectral image acquirer 603 causes the imaging device 21 to acquire light quantity measurement data (amount of received light) on the light having the specific wavelength as the spectral image. The spectral image acquirer 603 then stores the acquired spectral image in the storage section 17 along with the measurement wavelength, that is, the specific wavelength corresponding to the spectral image (S4A).

In the method for acquiring a spectral image described above, the spectroscopy section 41 is disposed in the optical axis of the light received by the imaging device 21 between the measurement target X and the imaging device 21. As a result, the spectroscopy section 41 transmits only the light having the specific wavelength contained in the light reflected off the measurement target X, and the imaging device 21 spectrally measures the intensity of the light having the specific wavelength as the spectral image.

<2A-4> After the acquisition of the spectral image of the light having the first specific wavelength, whether or not acquisition of a spectral image of light having a second specific wavelength different from the first specific wavelength is required is evaluated based on the condition and the like selected by the user in the step <1A> described above. That is, whether or not subsequent acquisition of a spectral image of light having a second specific wavelength different from the first specific wavelength is required is evaluated (S5A).

When the result of the evaluation (S5A) shows that acquisition of a spectral image of light having a second specific wavelength is required, the step <2A-2> described above to the present step <2A-4> are repeatedly carried out for the light having the second specific wavelength in place of the light having the first specific wavelength. That is, the voltage value applied to the space between the fixed electrode 412 and the movable electrode 422 of the electrostatic actuator 45 is changed to set the second specific wavelength, and then the step <2A-2> described above to the present step <2A-4> are repeatedly carried out. A spectral image of the light having the second specific wavelength is thus acquired. The acquisition of the spectral image of light having the second specific wavelength, that is, a different specific wavelength is repeatedly performed from the first acquisition, second acquisition to n-th acquisition. Repeatedly carrying out the step <2A-2> described above to the present step <2A-4> as described above allows the spectral information to be obtained as spectrum information $s_{sam}$ representing a specific wavelength versus optical intensity relationship corresponding to the pixels contained in the spectral image.

That is, the spectrum information $s_{sam}$ is expressed in FIG. 8 in the form of a graph representing the specific wavelength versus optical intensity relationship divided into n segments in the wavelength region greater than or equal to 400 nm but smaller than or equal to 760 nm, which is the visible light wavelength region, and the thus obtained graph, that is, spectrum information represents the summed spectral information at the pixels arranged in a matrix formed of M rows and N columns.

On the other hand, when it is unnecessary to acquire a spectral image of light having the following wavelength, the spectral image acquisition performed by the spectrometry section 10 is terminated, and the process proceeds to the following step <3A>.

To obtain the spectrum information $s_{sam}$, it is necessary to acquire spectral images of light having different specific wavelengths or light that belongs to different specific wavelength regions by repeating the step <2A-2> described above to the present step <2A-4> by n times, as described above. It therefore undesirably takes a long period to obtain the spectrum information $s_{sam}$. The problem occurs particularly when the measurement target X is an animal, so that the period for which the measurement target X is stationary is short, and the spectrum information $s_{sam}$ needs to be acquired in a short period, when spectral images are acquired over the entire visible light region (from about 400 to 760 nm), and when the value of n needs to be increased to obtain the spectrum information $s_{sam}$ with precision by narrowing the specific wavelength region where one spectral image is acquired.

When the smartphone 1 according to the present embodiment is used as an electronic picture book that identifies the type of the measurement target X, the category, that is, the group of the measurement target X to be identified has been inputted in advance by the user's operation performed on the input section 16 in the step <1A> described above. The wavelength region where the measurement target X can be identified is then known by the category to which the measurement target X to be identified belongs. That is, empirical knowledge indicates that, for example, when the category to which the measurement target X belongs is fish, the wavelength region where the type of fish can be identified is present in a region B of the visible light wavelength region shown in FIG. 8, and when the category to which the measurement target X belongs is flowers, the wavelength region where the type of a flower can be identified is present in a region C of the visible light wavelength region shown in FIG. 8.

Therefore, preferentially acquiring a wavelength region where the measurement target X can be identified in accordance with the category to which the measurement target X to be identified belongs, that is, in the prevent embodiment, selectively acquiring a wavelength region where the measurement target X can be identified and omitting the acquisition for the other wavelength regions, more specifically, preferentially, that is, selectively acquiring the region B from the visible light wavelength region shown in FIG. 8 when the category to which the measurement target X belongs is fish and preferentially, that is, selectively acquiring the region C from the visible light wavelength region shown in FIG. 8 when the category to which the measurement target X belongs is flowers allow acquisition of the spectrum information $s_{sam}$ in a short period in the present step <2A> and identification of the measurement target X with excellent identification accuracy in the following step <3A>. Further, since the amount of spectrum information $s_{sam}$ to be acquired decreases in the present step <2A>, the burden on the storage section 17 can be reduced.

Therefore, when the measurement target X is an animal, so that the period for which the measurement target X is stationary is short, and the spectrum information $s_{sam}$ needs to be acquired in a short period, further, even when the spectrum information $s_{sam}$ needs to be obtained with precision by narrowing the specific wavelength region where one spectral image is acquired, the spectrum information $s_{sam}$ can be reliably acquired in a short period.

Further, to preferentially acquire a wavelength region where the measurement target X can be identified in accordance with the category to which the measurement target X to be identified belongs, as described above, the wavelength region to be preferentially acquired may be weighted. That is, for example, in the visible light wavelength region shown in FIG. 8, the degree of preference may be set in the following weighting order: the region C>the region B>the region A in accordance with the category to which the measurement target X belongs, and the spectral information may be sequentially acquired in accordance with the degree of preference. As a result, when the measurement target X is an animal, and even when the acquisition of the spectrum information $s_{sam}$ is terminated in the middle of the acquisition due to the action of the measurement target X, the identification accuracy at which the measurement target X can be identified can be improved because the probability of preferential acquisition of a wavelength region where the measurement target X can be identified is increased.

In the case where the measurement target X is an animal, the spectrometry section 10 terminates the acquisition of the spectral information specific to the measurement target X when the spectrometry section 10 determines that it is difficult to acquire the spectral information specific to the measurement target X based on the movement of the measurement target X. The termination of the acquisition of the spectrum information $s_{sam}$ in the middle of the acquisition based on the action of the measurement target X is performed, for example, when an acceleration sensor provided in the smartphone 1 senses acceleration greater than or equal to a threshold and/or when it is recognized that the optical intensity sensed by the imaging device 21 changes by a value greater than or equal to a threshold when the imaging device 21 acquires a spectral image.

The termination of the acquisition of the spectrum information $s_{sam}$ in the middle of the acquisition can also occur when the user, that is, the smartphone 1 itself moves and it is determined based on the movement of the smartphone 1 that it is difficult to acquire spectral information as well as the case where it is determined that it is difficult to acquire spectral information based on the movement of the measurement target X. The spectrometry section 10 therefore terminates the acquisition of the spectral information specific to the measurement target X when it is determined based on the relative movement between the measurement target X and the spectrometry section 10 that it is difficult to acquire the spectral information specific to the measurement target X.

<3A> The analysis processor 604 then analyzes the spectral image based on the spectral image of the measurement target X and the specific wavelength at which the spectral image has been acquired, that is, based on the spectrum information $s_{sam}$ stored in the storage section 17 (S6A).

In other words, the analysis processor 604 acquires the spectrum information $s_{sam}$ stored in the storage section 17 in the step <2A> described above. The analysis processor 604 then uses the spectrum information $s_{sam}$ as the spectral information as a characteristic quantity to carry out an analysis process of comparing the spectrum information $s_{sam}$ with the database for identification of the imaged measurement target X.

Specifically, the analysis processor 604 calculates reflectance $r=s_{sam}/s_{ref}$ at which light is reflected off the measurement target X from the spectrum information $s_{sam}$ and the optical spectrum $s_{ref}$ associated with the light source 31.

The analysis processor 604 then acquires data $r^i$ contained in data corresponding to groups $i=1, \ldots, M$ stored in the storage section 17 in advance and evaluates using the data $r^i$ whether or not the reflectance r at which light is reflected off the measurement target X belongs to any of the groups i to identify the measurement target X. The "group" used herein refers to the category or a small category to which the measurement target X belongs, such as flowers, fish, and mammals, and data on the group corresponding to the category of the measurement target X inputted in advance is acquired in the step <1A> described above.

In more detail, the spectrum information $s_{sam}$ as a characteristic quantity is first projected into an evaluation space appropriate for evaluation of which group the reflectance r belongs to, that is, a projection function $f(\cdot)$ is created based on a specific evaluation reference. Examples of the evaluation reference may include the Fischer evaluation reference and the least square reference. The reflectance r at which light is reflected off the measurement target X is then projected into the evaluation space, and the result of the projection is called y.

$$y=f(r)$$

Similarly, the data $r^i$ on each of the groups M is also projected into the evaluation space, and the result of the projection is called $y(r^i)$. The distances $m^i$ ($i=1, \ldots, M$) in the evaluation space between the position y of the measurement target X in the evaluation space and the groups M is then calculated.

$$m^i(i=1, \ldots, M)=g(y,y(r^i))$$

In the above expression, $y(r^i)$ is a set of the positions of data that belong to the group i in the evaluation space, that is, $y(r^i)=\{y(r^i 1), \ldots, y(r^i_N)\}$ (in the expression, N represents the number of data that belong to the group i), and g(a, b) is the function for calculating the distance between a and b in the evaluation space. The distance can, for example, be Mahalanobis' distance or the Euclidean distance. One of $m^i$ ($i=1, \ldots, M$) that is the shortest distance is identified, and the type contained in the group i corresponding to the shortest distance is identified as a type H of the measurement target X.

$$H=\arg_i\min m^i$$

As described above, in the present step <3A>, the spectrum information $s_{sam}$, that is, the spectral information is used as the characteristic quantity for identifying the measurement target X and the measurement target X is identified based on the shape of the spectrum information $s_{sam}$. Therefore, when "the measurement target X resembles the background pattern," for example, even when a measurement target and the background have similar colors, such as a case where "a matsutake mushroom" in withered pine needles, "a green caterpillar" on a leaf, "a righteye or lefteye flounder" on a sandy beach, or "a stag beetle" or "a beetle" on a branch of a tree is identified as the measurement target X, the measurement target X can be accurately identified. Further, even when "the measurement target X faces frontward or rearward in the image capturing area" or when "the measurement target X extends off the image capturing area," the measurement target X can be accurately identified because no shape information is used as the characteristic quantity.

<4A> The display controller 605 then creates information on the measurement target X identified by the analysis processor 604 as a visualizing image and then causes the display 70, which includes the display section 15, to display the visualizing image (S7A).

When the measurement target X is an animal, such as fish and shellfish, an insect, and a mammal, or a plant, such as a flower and a tree, examples of the information on the measurement target X to be displayed as the visualizing image on the display 70 may include the type of the identified measurement target X, that is, the group H to which the measurement target X belongs and detailed information on the measurement target X, such as the category, distribution, morphology, and ecology thereof.

The display 70 displays information stored in the storage section 17 and can also display information disclosed on the Internet by using the communication function of the smartphone 1.

The measurement target X is identified by carrying out the steps <1A> to <4A>, in which the smartphone 1 is used as an electronic picture book, as described above.

The above description has been made of the case where the spectroscopic process of comparing the optical spectrum as the spectral information with the database stored in the storage section 17 is carried out by using the distances $m^i$ ($i=1, \ldots, M$) in the evaluation space, but not necessarily, and the analysis described above can be performed based on mechanical learning, such as a neural network.

Further, the identification of the measurement target X by using the smartphone 1 as an electronic picture book can also be applied, for example, to identification of a mineral, such as a jewel, a vehicle, such as a train and a car, a cloud, a constellation, and the like as well as the identification of an animal and a plant described above.

2) Method for Using Smartphone as Detector

A detection method for detecting the presence or absence of an animal, a plant, or the like as the measurement target X (target) the presence of which is desired to be identified and detecting the position of the present target measurement target X by using the smartphone 1 described above as a detector will be described below in detail with reference to FIG. 9 and other figures.

In the detection method using the smartphone 1 as a detector, the spectrometry section 10 is used to capture an image of an area where the measurement target X, that is, a detection target is expected to be present, and the presence or absence of the measurement target X, the position of the present measurement target X, the presence probability (%), and the like in the image capturing area imaged by the spectrometry section 10 are identified based on the captured spectral image. The identified contents are then displayed on the display 70.

<1B> The user first operates the input section 16 to activate application software that uses the smartphone 1 as a detector and then selects a condition and other factors in accordance with an instruction issued by the application software (S1B).

Examples of the condition inputted in accordance with the instruction issued by the application software may include the type of the measurement target X desired to be detected in the captured image. The input of the type of the measurement target X to be detected allows preferential acquisition of a wavelength region where the presence or absence of the measurement target X in the image capturing region imaged with the smartphone 1, whereby the measurement target X can be quickly detected in the area imaged with the smartphone 1. The quick detection performed by the smartphone 1 will be described later in detail.

<2B> The user then operates the input section 16 to issue an input instruction that instructs the smartphone 1, that is, the spectrometry section 10 to capture an image of an area where the user desires to detect the measurement target X. The control section 60 then controls the action of the spectrometry section 10 based on the input instruction to capture an image of an image capturing area where the user desires to detect the measurement target X.

<2B-1> The light source controller 601 first turns on the light source 31 in accordance with the user's input instruction performed on the input section 16 and representing capture of an image of the image capturing area (S2B).

When the light source 31 is turned on, the image capturing area where the user desires to detect the measurement target X is irradiated with the illumination light outputted from the light source 31. The radiated light is then reflected off the image capturing area, and the reflected light enters as incident light the spectroscopy section 41.

<2B-2> The spectroscopy controller 602 then acquires a voltage value (input value) of the drive voltage corresponding to the spectrally separated wavelength, that is, the specific wavelength to be outputted based on the V-λ data stored in the storage section 17. The spectroscopy controller 602 then outputs an instruction signal that applies the acquired voltage value to the electrostatic actuator 45 of the Fabry-Perot etalon filter as the spectroscopy section 41 (S3B).

As a result, out of the light incident as the incident light from the measurement target X on the spectroscopy section 41, the light having the specific wavelength is selectively outputted as the output light toward the imaging device 21.

Before the spectroscopy section 41 outputs the light having the specific wavelength, the spectroscopy controller 602 preferably performs adjustment or calibration of the spectroscopy section 41. The optical spectrum $s_{ref}$ associated with the light source 31 is thus acquired.

<2B-3> The spectral image acquirer 603 then controls the action of the imaging device 21 to cause the imaging device 21 to acquire the light having the specific wavelength outputted as the output light from the spectroscopy section 41 as the spectral image. That is, out of the reflected light reflected off the measurement target X, the spectral image acquirer 603 causes the imaging device 21 to acquire light quantity measurement data (amount of received light) on the light having the specific wavelength as the spectral image. The spectral image acquirer 603 then stores the acquired spectral image in the storage section 17 along with the measurement wavelength, that is, the specific wavelength corresponding to the spectral image (S4B).

In the method for acquiring a spectral image described above, the spectroscopy section 41 is disposed in the optical axis of the light received by the imaging device 21 between the image capturing area where the user desires to detect the measurement target X and the imaging device 21. As a result, the spectroscopy section 41 transmits only the light having the specific wavelength contained in the light reflected off the image capturing area, and the imaging device 21 spectrally measures the intensity of the light having the specific wavelength as the spectral image.

<2B-4> After the acquisition of the spectral image of the light having the first specific wavelength, whether or not acquisition of a spectral image of light having a second specific wavelength different from the first specific wavelength is required is evaluated based on the condition and the like selected by the user in the step <1B> described above. That is, whether or not subsequent acquisition of a spectral image of light having a second specific wavelength different from the first specific wavelength is required is evaluated (S5B).

When the result of the evaluation (S5B) shows that acquisition of a spectral image of light having a second specific wavelength is required, the step <2B-2> described above to the present step <2B-4> are repeatedly carried out for the light having the second specific wavelength in place of the light having the first specific wavelength. That is, the magnitude of the voltage applied to the space between the fixed electrode 412 and the movable electrode 422 of the electrostatic actuator 45 is changed to set the second specific wavelength, and then the step <2B-2> described above to the present step <2B-4> are repeatedly carried out. A spectral image of the light having the second specific wavelength is thus acquired. The acquisition of the spectral image of light having the second specific wavelength, that is, a different specific wavelength is repeatedly performed from the first acquisition, second acquisition to n-th acquisition. Repeatedly carrying out the step <2B-2> described above to the present step <2B-4> as described above allows the spectral information to be obtained as the spectrum information $s_{sam}$ representing the specific wavelength versus optical intensity relationship corresponding to the pixels in the image capturing area where the user desires to detect the measurement target X.

That is, the spectrum information $s_{sam}$ is expressed in FIG. 8 in the form of the graph representing the specific wavelength versus optical intensity relationship divided into n segments in the wavelength region greater than or equal to 400 nm but smaller than or equal to 760 nm, which is the visible light wavelength region, and the thus obtained graph, that is, spectrum information represents the summed spectral information in the image capturing area having the pixels arranged in the matrix formed of M rows and N columns.

On the other hand, when it is unnecessary to acquire a spectral image of light having the following wavelength, the spectral image acquisition performed by the spectrometry section 10 is terminated, and the control proceeds to the following step <3B>.

To obtain the spectrum information $s_{sam}$, it is necessary to acquire spectral images of light having different specific wavelengths or light that belongs to different specific wavelength regions by repeating the step <2B-2> described above to the present step <2B-4> by n times, as described above. It therefore undesirably takes a long period to obtain the spectrum information $s_{sam}$. The problem occurs particularly when the measurement target X is an animal, so that the period for which the measurement target X is stationary is short, and the spectrum information $s_{sam}$ needs to be acquired in a short period, when spectral images are acquired over the entire visible light region (from about 400 to 760 nm), and when the value of n needs to be increased to obtain the spectrum information $s_{sam}$ with precision by narrowing the specific wavelength region where one spectral image is acquired.

In the case where the smartphone 1 according to the present embodiment is used as a detector that detects the measurement target X from the image capturing area imaged with the smartphone 1, the type of the measurement target X to be detected has been inputted in advance by the user's operation performed on the input section 16 in the step <1B> described above. The wavelength region where the measurement target X can be identified is then known by the type of the measurement target X to be detected. That is, empirical knowledge indicates that, for example, when the type of the measurement target X is beetles, the wavelength region that allows identification of the presence of a beetle is present in the region B of the visible light wavelength region shown in FIG. 8, and when the type of the measurement target X is matsutake mushrooms, the wavelength region that allows identification of the presence of a matsutake mushroom is present in the region C of the visible light wavelength region shown in FIG. 8.

Therefore, preferentially acquiring a wavelength region that allows identification of the presence of the measurement target X in accordance with the type of the measurement target X to be detected, that is, in the present embodiment, selectively acquiring a wavelength region that allows identification of the measurement target X and omitting the acquisition for the other wavelength regions, more specifically, preferentially, that is, selectively acquiring the region B from the visible light wavelength region shown in FIG. 8 when the measurement target X to be detected is a beetle and preferentially, that is, selectively acquiring the region C from the visible light wavelength region shown in FIG. 8 when the measurement target X to be detected is a matsutake mushroom allow acquisition of the spectrum information $s_{sam}$ in a short period in the present step <2B> and identification of the measurement target X with excellent identification accuracy in the following step <3B>. Further, since the amount of spectrum information $s_{sam}$ to be acquired decreases in the present step <2B>, the burden on the storage section 17 can be reduced.

Therefore, when the measurement target X is an animal, so that the period for which the measurement target X is stationary is short, and the spectrum information $s_{sam}$ needs to be acquired in a short period, further, even when the spectrum information $s_{sam}$ needs to be obtained with precision by narrowing the specific wavelength region where one spectral image is acquired, the spectrum information $s_{sam}$ can be reliably acquired in a short period.

Further, to preferentially acquire a wavelength region that allows identification of the presence of the measurement target X in accordance with the type of the measurement target X to be detected, as described above, the wavelength region to be preferentially acquired may be weighted. That is, for example, in the visible light wavelength region shown in FIG. 8, the degree of preference may be set in the following weighting order: the region C>the region B>the region A in accordance with the type of the measurement target X, and the spectral information may be sequentially acquired in accordance with the degree of preference. As a result, when the measurement target X is an animal, and even when the acquisition of the spectrum information $s_{sam}$ is terminated in the middle of the acquisition due to the action of the measurement target X, the detection accuracy at which the presence or absence of the measurement target X in the image capturing area can be detected can be improved because the probability of preferential acquisition of a wavelength region that allows identification of the presence of the measurement target X is increased.

In the case where the measurement target X is an animal, the spectrometry section 10 terminates the acquisition of the spectral information specific to the measurement target X when the spectrometry section 10 determines that it is difficult to acquire the spectral information specific to the measurement target X based on the movement of the measurement target X. The termination of the acquisition of the spectrum information $s_{sam}$ in the middle of the acquisition based on the action of the measurement target X is performed, for example, when it is recognized that the optical intensity sensed by the imaging device 21 changes by a value greater than or equal to a threshold when the imaging device 21 acquires a spectral image.

<3B> The analysis processor 604 then analyzes the spectral image based on the spectral image of the measurement target X and the specific wavelength at which the spectral image has been acquired, that is, based on the spectrum information $s_{sam}$ stored in the storage section 17 (S6B).

In other words, the analysis processor 604 acquires the spectrum information $s_{sam}$ stored in the storage section 17 in the step <2B> described above. The analysis processor 604 then uses the spectrum information $s_{sam}$ as a characteristic quantity having the spectral information to carry out the analysis process for detection of the measurement target X, which is the target, from the image capturing area imaged by the spectrometry section 10.

Specifically, the analysis processor 604 calculates the reflectance $r=s_{sam}/s_{ref}$ in the image capturing area where the user desires to detect the measurement target X from the spectrum information $s_{sam}$ and the optical spectrum $s_{ref}$ associated with the light source 31. The image capturing area is then divided into areas corresponding to the pixels in the M rows by N columns to calculate data $r^i_j$ corresponding to the M×N divided areas (i=1, ..., M), (j=1, ..., N).

The analysis processor 604 then acquires reflectance $r_{base}$ corresponding to measurement target X in the database prepared in advance in the storage section 17 and evaluates whether or not the reflectance $r^i_j$ corresponding to the M divided areas belongs to the reflectance $r_{base}$ corresponding to measurement target X to identify the position where the measurement target X is present in the image capturing area.

In more detail, the projection function f(·) for projection into the evaluation space appropriate for evaluation of the groups is created based on the specific evaluation reference. Examples of the evaluation reference may include the Fischer evaluation reference and the least square reference. The reflectance $r_{base}$ at which light is reflected off the measurement target X stored in the database is then projected into the evaluation space, and the result of the projection is called y.

$$y=f(r_{base})$$

Similarly, the data $r^i_j$ corresponding to the M×N divided areas (i=1, ..., M), (j=1, ..., N) are also projected into the evaluation space, and the result of the projection is called $y(r^i_j)$. The distances $m^i_j$ (i=1, ..., M), (j=1, ... N) in the evaluation space between the measurement target X and the areas (i=1, ..., M), (j=1, ..., N) is then calculated.

$$m^i_j(i=1,\ldots,M),(j=1,\ldots,N)=g(y,y(r^i_j))$$

In the above expression, g( ) is the function for calculating the distance in the evaluation space. The distance can, for example, be Mahalanobis' distance or the Euclidean distance.

When out of the distance $m^i_j$ (i=1, ..., M), (j=1, ..., N), the distance $m^i_j$ is smaller than a certain set threshold, it is determined that there is a possibility of the presence of the measurement target X in the area, that is, it is determined that the measurement target X has been detected in the area, and the threshold is further reduced to a smaller value, whereby the probability (%) of the presence of the measurement target X in the area can be improved.

As described above, in the present step <3B>, the spectrum information $s_{sam}$, that is, the spectral information is used as the characteristic quantity for detecting the measurement target X and the measurement target X in the image capturing area is detected based on the shape of the spectrum information $s_{sam}$. Therefore, when "the measurement target X resembles the background pattern," for example, even when a measurement target and the background have similar colors, such as the case where "a matsutake mushroom" in withered pine needles, "a green caterpillar" on a leaf, "a righteye or lefteye flounder" on a sandy beach, or "a stag beetle" or "a beetle" on a branch of a tree is detected as the measurement target X, the measurement target X can be accurately detected in the image capturing area. Further, even when "the measurement target X faces frontward or rearward in the image capturing area" or when "the measurement target X extends off the image capturing area," the measurement target X can be accurately detected because no shape information is used as the characteristic quantity.

<4B> The display controller 605 then creates a visualizing image with enhanced display, for example, by extracting an area determined to contain the measurement target X from the image capturing area imaged by the spectrometry section 10 and marking the extracted area in red or any other color. The display controller 605 then causes the display 70, which includes the display section 15, to display the visualizing image (S7B). It is noted in FIG. 1 that the display section 15 identifies the position where insects, such as a beetle and a stag beetle, as the measurement target X perch on trees by the mark-based enhancement.

In the visualizing image, in addition to the mark placed on the area determined to contain the measurement target X, for example, the presence probability (%) at which the measurement target X is present in the vicinity of the mark may be displayed, and the color of the mark may be changed in accordance with the presence probability (%) at which the measurement target X is present.

The presence or absence of the measurement target X, and the position where the measurement target X is present in the image capturing area where the measurement target X is expected to be present can be detected by carrying out the steps <1B> to <4B>, in which the smartphone 1 is used as a detector, as described above.

The detection of the measurement target X in the image capturing area by using the smartphone 1 as a detector can also be applied, for example, to detection of a mineral, such as a jewel, a cloud, a constellation, and the like as well as the detection of an animal and a plant described above.

3) Method for Using Smartphone as Authenticator

An authentication method for authenticating the genuineness (authenticity) of an article, such as a bag, a purse, a timepiece, and a jewel, as the measurement target X and assessing the degree of degradation of the article over time by using the smartphone 1 described above as an authenticator will be described below in detail with reference to FIG. 10 and other figures.

In the authentication method using the smartphone 1 as an authenticator, the spectrometry section 10 is used to capture an image of the measurement target X to be authenticated, and the genuineness of the measurement target X or the degree of degradation of the measurement target X over time are authenticated based on the captured spectral image. The identified contents are then displayed on the display 70.

<1C> The user first operates the input section 16 to activate application software that uses the smartphone 1 as an authenticator and then selects a condition and other factors as required in accordance with an instruction issued by the application software (SIC).

Examples of the condition inputted in accordance with the instruction issued by the application software may include the type of the measurement target X, that is, an article to be authenticated, in other words, the product number of the measurement target X and the type of authentication, such as the authenticity and the degree of degradation over time. The input of the product number of the measurement target X to be authenticated in advance allows quick evaluation of the genuineness of the measurement target X or the degree of degradation of the measurement target X over time in the image capturing region imaged with the smartphone 1. The quick evaluation performed by the smartphone 1 will be described later in detail.

<2C> The user then operates the input section 16 to issue an input instruction that instructs the smartphone 1, that is, the spectrometry section 10 to capture an image of the measurement target X, and the control section 60 controls the action of the spectrometry section 10 based on the input instruction to capture an image of the measurement target X at a specific wavelength.

<2C-1> The light source controller 601 first turns on the light source 31 in accordance with the user's input instruction performed on the input section 16 and representing capture of an image of the measurement target X (S2C).

When the light source 31 is turned on, the measurement target X is irradiated with the illumination light outputted from the light source 31. The radiated light is then reflected off the measurement target X, and the reflected light enters as incident light the spectroscopy section 41.

<2C-2> The spectroscopy controller 602 then acquires a voltage value (input value) of the drive voltage corresponding to the spectrally separated wavelength, that is, the specific wavelength to be outputted based on the V-λ data stored in the storage section 17. The spectroscopy controller 602 then outputs an instruction signal that applies the acquired voltage value to the electrostatic actuator 45 of the Fabry-Perot etalon filter as the spectroscopy section 41 (S3C).

As a result, out of the light incident as the incident light from the measurement target X on the spectroscopy section 41, the light having the specific wavelength is selectively outputted as the output light toward the imaging device 21.

Before the spectroscopy section 41 outputs the light having the specific wavelength, the spectroscopy controller 602 preferably performs adjustment or calibration of the spectroscopy section 41. The optical spectrum $s_{ref}$ associated with the light source 31 is thus acquired.

<2C-3> The spectral image acquirer 603 then controls the action of the imaging device 21 to cause the imaging device 21 to acquire the light having the specific wavelength outputted as the output light from the spectroscopy section 41 as the spectral image. That is, out of the reflected light reflected off the measurement target X, the spectral image acquirer 603 causes the imaging device 21 to acquire light quantity measurement data (amount of received light) on the light having the specific wavelength as the spectral image. The spectral image acquirer 603 then stores the acquired spectral image in the storage section 17 along with the measurement wavelength, that is, the specific wavelength corresponding to the spectral image (S4C).

In the method for acquiring a spectral image described above, the spectroscopy section 41 is disposed in the optical axis of the light received by the imaging device 21 between the measurement target X and the imaging device 21. As a result, the spectroscopy section 41 transmits only the light having the specific wavelength contained in the light reflected off the measurement target X, and the imaging device 21 spectrally measures the intensity of the light having the specific wavelength as the spectral image.

<2C-4> After the acquisition of the spectral image of the light having the first specific wavelength, whether or not acquisition of a spectral image of light having a second specific wavelength different from the first specific wavelength is required is evaluated based on the condition and the like selected by the user in the step <1C> described above. That is, whether or not subsequent acquisition of a spectral image of light having a second specific wavelength different from the first specific wavelength is required is evaluated (S5C).

When the result of the evaluation (S5C) shows that acquisition of a spectral image of light having a second specific wavelength is required, the step <2C-2> described above to the present step <2C-4> are repeatedly carried out for the light having the second specific wavelength in place of the light having the first specific wavelength. That is, the voltage value applied to the space between the fixed electrode 412 and the movable electrode 422 of the electrostatic actuator 45 is changed to set the second specific wavelength, and then the step <2C-2> described above to the present step <2C-4> are repeatedly carried out. A spectral image of the light having the second specific wavelength is thus acquired. The acquisition of the spectral image of light having the second specific wavelength, that is, a different specific wavelength is repeatedly performed from the first acquisition, second acquisition to n-th acquisition. Repeatedly carrying out the step <2C-2> described above to the present step <2C-4> as described above allows the spectral information to be obtained as the spectrum information $s_{sam}$ representing the specific wavelength versus optical intensity relationship corresponding to the pixels contained in the spectral image.

That is, the spectrum information $s_{sam}$ is expressed in FIG. 8 in the form of the graph representing the specific wavelength versus optical intensity relationship divided into n segments in the wavelength region greater than or equal to 400 nm but smaller than or equal to 760 nm, which is the visible light wavelength region, and the thus obtained graph, that is, spectrum information represents the summed spectral information at the pixels arranged in the matrix formed of M rows and N columns.

On the other hand, when it is unnecessary to acquire a spectral image of light having the following wavelength, the spectral image acquisition performed by the spectrometry section 10 is terminated, and the control proceeds to the following step <3C>.

To obtain the spectrum information $s_{sam}$, it is necessary to acquire spectral images of light having different specific wavelengths or light that belongs to different specific wavelength regions by repeating the step <2C-2> described above to the present step <2C-4> by n times, as described above. It therefore undesirably takes a long period to obtain the spectrum information $s_{sam}$. The problem occurs particularly when spectral images are acquired over the entire visible light region (from about 400 to 760 nm) and when the value of n needs to be increased to obtain the spectrum information $s_{sam}$ with precision by narrowing the specific wavelength region where one spectral image is acquired.

When the smartphone 1 according to the present embodiment is used as an authenticator that authenticates an article as the measurement target X, the type, that is, the product number of the measurement target X to be authenticated has been inputted in advance by the user's operation performed on the input section 16 in the step <1C> described above. The wavelength region where the genuineness and the degree of degradation of the measurement target X can be evaluated, that is, identified is then known by the type of the measurement target X to be authenticated. That is, empirical knowledge indicates that, for example, when the type of the measurement target X to be authenticated is a shoulder bag from a brand A, the wavelength region that allows identification of the presence of a shoulder bag from the brand A is present in the region B of the visible light wavelength region shown in FIG. 8, and when the type of the measurement target X is diamond, the wavelength region that allows identification of the presence of diamond is present in the region C of the visible light wavelength region shown in FIG. 8.

Therefore, preferentially acquiring a wavelength region that allows evaluation, that is, identification of the genuineness of the measurement target X or the degree of degradation of the measurement target X over time in accordance with the type of the measurement target X to be detected, that is, in the present embodiment, selectively acquiring a wavelength region that allows identification of the measurement target X and omitting the acquisition for the other wavelength regions, more specifically, preferentially, that is, selectively acquiring the region B from the visible light wavelength region shown in FIG. 8 when the measurement target X to be authenticated is the shoulder bag rom the brand A and preferentially, that is, selectively acquiring the region C from the visible light wavelength region shown in FIG. 8 when the measurement target X to be authenticated is diamond allow acquisition of the spectrum information $s_{sam}$ in a short period in the present step <2C> and identification of the measurement target X with excellent identification accuracy in the following step <3C>. Further, since the amount of spectrum information $s_{sam}$ to be acquired decreases in the present step <2C>, the burden on the storage section 17 can be reduced.

Therefore, even when the spectrum information $s_{sam}$ needs to be obtained with precision by narrowing the specific wavelength region where one spectral image is acquired, the spectrum information $s_{sam}$ can be reliably acquired in a short period.

Further, to preferentially acquire a wavelength region that allows identification of the presence of the measurement target X in accordance with the type of the measurement target X to be authenticated, as described above, the wavelength region to be preferentially acquired may be weighted.

That is, for example, in the visible light wavelength region shown in FIG. 8, the degree of preference may be set in the following weighting order: the region C>the region B> the region A in accordance with the type of the measurement target X, and a spectral image may be sequentially acquired in the order described above.

<3C> The analysis processor 604 then analyzes the spectral image based on the spectral image of the measurement target X and the specific wavelength at which the spectral image has been acquired, that is, based on the spectrum information $s_{sam}$ stored in the storage section 17 (S6C).

In other words, the analysis processor 604 acquires the spectrum information $s_{sam}$ stored in the storage section 17 in the step <2C> described above. The analysis processor 604 then uses the spectrum information $s_{sam}$ as a characteristic quantity having the spectral information to carry out the analysis process for authentication of the measurement target X imaged by the spectrometry section 10.

Specifically, the analysis processor 604 calculates the reflectance $r = s_{sam}/s_{ref}$ at which light is reflected off the measurement target X, from the spectrum information $s_{sam}$ and the optical spectrum $s_{ref}$ associated with the light source 31.

The analysis processor 604 then acquires reflectance $r^i$ corresponding to a genuine article (i=x) of the measurement target X out of data $r^i$ corresponding to the groups i=1, ..., M stored in the storage section 17 in advance and uses $r^i$ to evaluate whether or not the reflectance r at which light is reflected off the measurement target X is equal to the reflectance $r^i$ at which light is reflected off the genuine article for authentication of the measurement target X.

In more detail, the projection function $f(\cdot)$ for projection into the evaluation space appropriate for evaluation of the groups is created based on the specific evaluation reference. Examples of the evaluation reference may include the Fischer evaluation reference and the least square reference.

When the type of the authentication is genuineness of an article, the reflectance r at which light is reflected off the measurement target X is then projected into the evaluation space, and the result of the projection is called y.

$$y = f(r)$$

Similarly, the data $r^i$ on a new genuine article (i=x) is also projected into the evaluation space, and the result of the projection is called $y(r^i)$. The distance $m^i$ (i=x) in the evaluation space between the position y of the measurement target X in the evaluation space and the genuine article (i=x) is then calculated.

$$m^i(i=x) = g(y, y(r^i))$$

In the above expression, g( ) is the function for calculating the distance in the evaluation space. The distance can, for example, be Mahalanobis' distance or the Euclidean distance.

When the magnitude of $m^i$ (i=x) is smaller than a set threshold, it is determined that the measurement target is a genuine article, and the threshold is further reduced to a smaller value, whereby the probability (%) of the measurement target X being a genuine article can be improved.

When the type of the authentication is the degree of degradation of the article over time, the reflectance r at which light is reflected off the measurement target X is then projected into the evaluation space, and the result of the projection is called y.

$$y = f(r)$$

Similarly, the data $r^i$ on genuine articles (i=1, ..., M) acquired on a degradation degree basis are also projected into the evaluation space, and the result of the projection is called $y(r^i)$. The distances $m^i$ (i=1, ..., M) in the evaluation space between the position y of the measurement target X in the evaluation space and the genuine articles (i=1, ..., M) according to the degree of degradation are then calculated.

$$m^i(i=1,\ldots,M) = g(y, y(r^i))$$

In the above expression, $y(r^i)$ is a set of the positions of data that belong to the genuine articles in the evaluation space, that is, $y(r^i) = \{y(r^i\ 1), \ldots, y(r^i_N)\}$ (in the expression, N represents the number of data that belong to the group i), and g(a, b) is the function for calculating the distance between a and b in the evaluation space. The distance can, for example, be Mahalanobis' distance or the Euclidean distance.

When the magnitude of $m^i$ (i=1, ..., M) is smaller than a set threshold, the result of the authentication can be the degree of degradation over time specified in the group i to which the measurement target belongs.

<4C> The display controller 605 then creates information on the measurement target X identified by the analysis processor 604 as a visualizing image and then causes the display 70, which includes the display section 15, to display the visualizing image (S7C).

When the classification of the authentication is the genuineness of the measurement target X, the visualizing image shows the result of the evaluation of whether or not the measurement target X is a genuine article and further shows the probability (%) of the genuineness and other pieces of information as well as the image of the authenticated measurement target X, and when the classification of the authentication is the degree of degradation of the measurement target X over time, the visualizing image shows the degree (%) of the degradation of the measurement target X and further shows an assessed price of the measurement target X and other pieces of information thereon based on the degree of degradation. When the classification of the authentication is the genuineness of the measurement target X, and when the result of the authentication shows that the measurement target X is a genuine article, the classification of the authentication may automatically transition to the authentication of the degree of degradation of the measurement target X over time.

The measurement target X is authenticated by carrying out the steps <1C> to <4C>, in which the smartphone 1 is used as an authenticator, as described above.

Further, the authentication of the measurement target X by using the smartphone 1 as an authenticator can also be applied, for example, to authentication of an article, such as a bag, a purse, a timepiece, and a jewel, and when the authenticator is used to authenticate the genuineness of the measurement target X, the authentication can be applied, for example, to identification of an animal, a plant, a cloud, and a constellation.

Further, in the present embodiment, the above description has been made of the case where the reflectance at which light is reflected off the measurement target X is used as the spectral information to identify the measurement target X, but not necessarily. For example, the measurement target X can be identified also when the transmittance at which light passes through the measurement target X, the absorbance at which light is absorbed by the measurement target X, data converted based on the Kubelka-Munk theory, and the like are used as the spectral information.

The present embodiment has been described with reference to the case where the spectrometry section 10 includes the light source 31, the spectroscopy section 41, and the imaging device 21 as the spectroscopic camera, and the spectrometry section 10 may instead include no light source 31 among the components described above. In this case, irradiation of the measurement target X with light performed by the spectrometry section 10 is instead performed by using outside light, such as the sunlight and interior illumination, in the steps <2A>, <2B>, and <2C> described above, in which the spectrometry section 10 captures a spectral image.

Further, the present embodiment has been described with reference to the smartphone 1 by way of example, provided that an information terminal by itself completes the information system according to the present disclosure. The information terminal is, however, not limited to the smartphone 1 and may, for example, be a tablet terminal, a notebook-shaped personal computer, a digital camera, a digital video recorder, an in-vehicle monitor, and a drive recorder. When an information terminal by itself completes the information system according to the present disclosure, as in the present embodiment, the information system can be used off line, whereby the information system can be used at a location where the communication status is unstable.

The present embodiment has been described with reference to the case where the input section 16 is formed of a touch panel, but not necessarily, and the input section 16 may be operational buttons provided on the enclosure of the smartphone 1. Still instead, the input is made in the form of voice via a microphone provided in the smartphone 1, or any of the approaches described above may be combined with each other.

Second Embodiment

A second embodiment of the information system according to the present disclosure will next be described.

Figure 11:
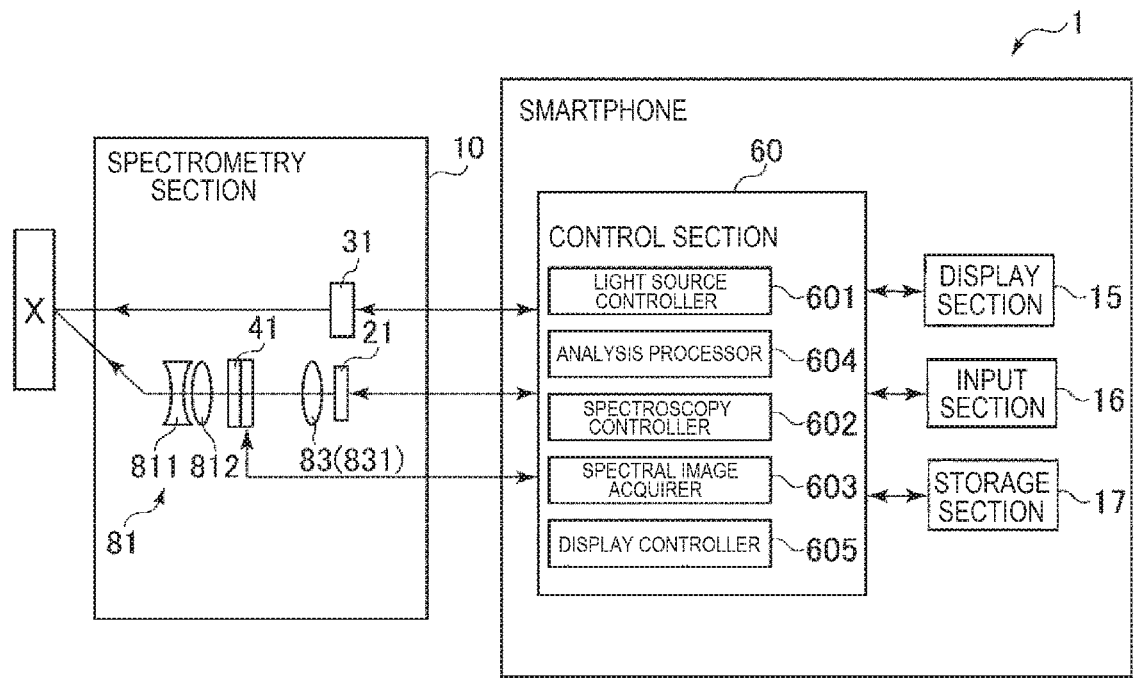
FIG. 11 is a block diagram showing a schematic configuration of a smartphone and a spectrometry section to which a second embodiment of the information system according to the present disclosure is applied.

FIG. 11 is a block diagram showing a schematic configuration of a smartphone and a spectrometry section to which the second embodiment of the information system according to the present disclosure is applied.

The information system according to the second embodiment will be described below primarily on differences from the information system according to the first embodiment described above, and the same items as those in the first embodiment will not be described.

The information system according to the second embodiment shown in FIG. 11 is the same as the information system according to the first embodiment described above except that the spectrometry section 10 is independently provided in addition to the smartphone 1 as an information terminal, and that the spectrometry section 10 functions as a spectroscopic camera. That is, in the information system according to the second embodiment, the smartphone 1, which is an information terminal, by itself does not complete the information system according to the present disclosure, which includes the smartphone 1 as an information terminal and the spectrometry section 10 as a spectroscopic camera.

In the information system according to the second embodiment, the smartphone 1 accommodates no spectrometry section 10, and the spectrometry section 10 is instead provided as an independent spectroscopic camera externally to the smartphone 1, as shown in FIG. 11, with the action of the spectrometry section 10 being controllable by the smartphone 1. The control of the spectrometry section 10 performed by the smartphone 1 may be based on wired or wireless electrical connection between the smartphone 1 and the spectrometry section 10.

In the thus configured information system according to the second embodiment, the acquisition of an image containing the measurement target X performed by the spectrometry section 10 and the setting of a condition for identifying the measurement target X and other types of operation performed by the smartphone 1 can be performed independently of each other. The operability of the information system can therefore be improved.

Further, installing application software on the smartphone 1 and connecting the smartphone 1 to the spectrometry section 10 allow use of the information system according to the present disclosure, whereby excellent versatility is achieved because the smartphone 1 including no spectrometry section 10 can be used.

Moreover, employing the configuration in which the smartphone 1 and the spectrometry section 10 complete the information system according to the present disclosure allows use of the information system off line except communication between the smartphone 1 and the spectrometry section 10, whereby the information system can be used at a location where the communication status is unstable.

The thus configured information system according to the second embodiment also provides the same effects as those provided by the first embodiment described above.

The present embodiment has been described with reference to the case where the information system according to the present disclosure includes the smartphone 1 as an information terminal and the spectrometry section 10 as a spectroscopic camera. The information system according to the present disclosure may instead be so configured that the information terminal is formed, for example, of a table terminal in place of the smartphone 1 or that the smartphone 1, that is, the information terminal may be formed, for example, of a server.

Third Embodiment

A third embodiment of the information system according to the present disclosure will next be described.

Figure 12:
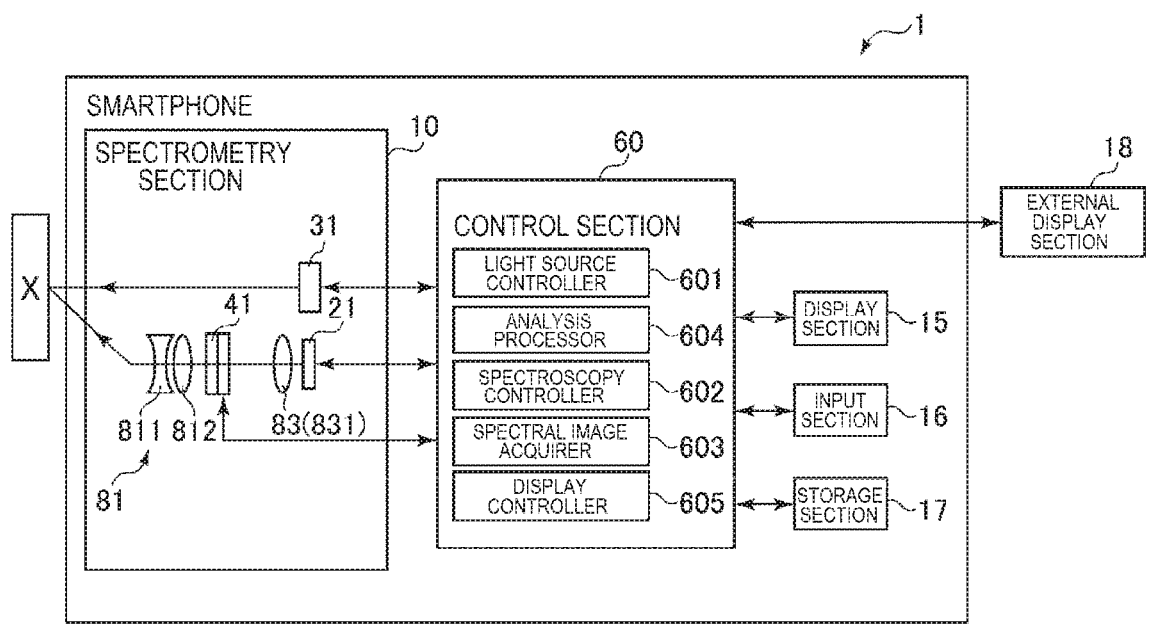
FIG. 12 is a block diagram showing a schematic configuration of a smartphone and an external display section to which a third embodiment of the information system according to the present disclosure is applied.

FIG. 12 is a block diagram showing a schematic configuration of a smartphone and an external display section to which the third embodiment of the information system according to the present disclosure is applied.

The information system according to the third embodiment will be described below primarily on differences from the information system according to the first embodiment described above, and the same items as those in the first embodiment will not be described.

The information system according to the third embodiment shown in FIG. 12 is the same as the information system according to the first embodiment described above except that an external display section 18 is further independently provided in addition to the smartphone 1 as an information terminal, and that the external display section 18 functions as a display section external to the smartphone 1. That is, in the information system according to the third embodiment, the smartphone 1, which is an information terminal, by itself does not complete the information system according to the present disclosure, which includes the smartphone 1 as an information terminal and the external display section 18.

The information system according to the third embodiment includes the external display section 18 independently so provided as to be external to the smartphone 1 in addition to the display section 15 provided in the smartphone 1, as shown in FIG. 12, with the action of the external display section 18 being controllable by the smartphone 1. The control of the external display section 18 performed by the smartphone 1 may be based on wired or wireless electrical connection between the smartphone 1 and the external display section 18.

In the thus configured information system according to the third embodiment, checking of an image on the external display section 18 performed by the operator and the setting of a condition for identifying the measurement target X and other types of operation performed by the smartphone 1 can be performed independently of each other, whereby the operability of the information system can be improved.

Further, employing the configuration in which the smartphone 1 and the external display section 18 complete the information system according to the present disclosure allows use of the information system off line except communication between the smartphone 1 and the external display section 18, whereby the information system can be used at a location where the communication status is unstable.

Examples of the external display section 18 may include a mobile notebook PC, a tablet terminal, a head-up display (HUD), and a head mounted display (HMD). Among them, external display section 18 is preferably a head mounted display. A head mounted display allows, for example, the result of the identification of the measurement target X, the position where the measurement target X is expected to be present, and the like to be displayed in the form of augmented reality (AR) and further allows hands-free use of the information system, whereby the operability of the information system can be further improved.

The thus configured information system according to the third embodiment also provides the same effects as those provided by the first embodiment described above.

Fourth Embodiment

A fourth embodiment of the information system according to the present disclosure will next be described.

Figure 13:
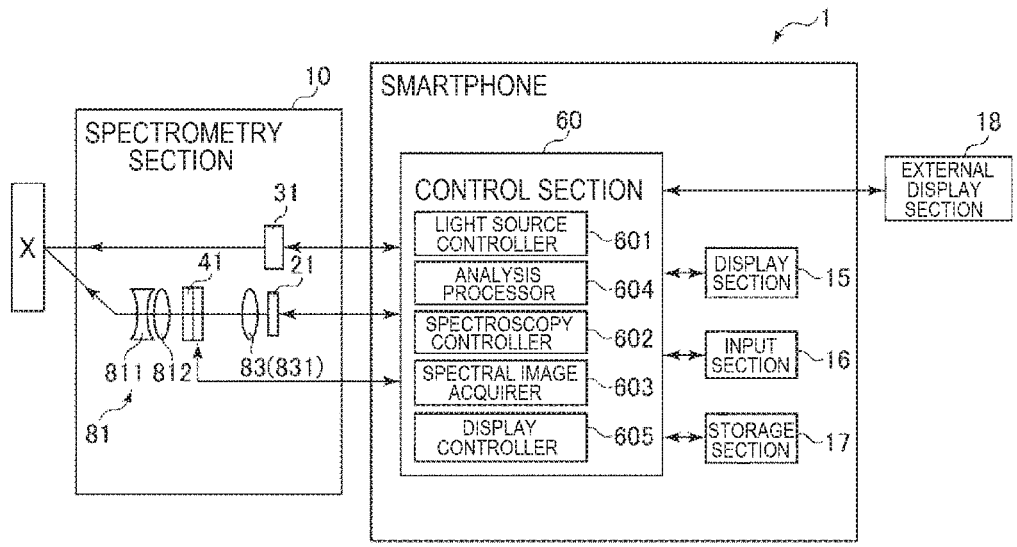
FIG. 13 is a block diagram showing a schematic configuration of a smartphone, a spectrometry section, and an external display section to which a fourth embodiment of the information system according to the present disclosure is applied.

FIG. 13 is a block diagram showing a schematic configuration of a smartphone, a spectrometry section, and an external display section to which the fourth embodiment of the information system according to the present disclosure is applied.

The information system according to the fourth embodiment will be described below primarily on differences from the information system according to the first embodiment described above, and the same items as those in the first embodiment will not be described.

The information system according to the fourth embodiment shown in FIG. 13 is the same as the information system according to the first embodiment described above except that the spectrometry section 10 and the external display section 18 are further independently provided in addition to the smartphone 1 as an information terminal, that the spectrometry section 10 functions as a spectroscopic camera, and that the external display section 18 functions as a display section external to the smartphone 1. That is, in the information system according to the fourth embodiment, the smartphone 1, which is an information terminal, by itself does not complete the information system according to the present disclosure, which includes the smartphone 1 as an information terminal, the spectrometry section 10, and the external display section 18.

In the information system according to the fourth embodiment, the smartphone 1 accommodates no spectrometry section 10, and the spectrometry section 10 is instead provided as an independent spectroscopic camera externally to the smartphone 1, as shown in FIG. 13, with the action of the spectrometry section 10 being controllable by the smartphone 1. Further, the information system according to the fourth embodiment includes the external display section independently provided as a component external to the smartphone 1, and with the action of the external display section 18 being controllable by the smartphone 1.

The control of the spectrometry section 10 performed by the smartphone 1 may be based on wired or wireless electrical connection between the smartphone 1 and the spectrometry section 10, and the control of the external display section 18 performed by the smartphone 1 may be based on wired or wireless electrical connection between the smartphone 1 and the external display section 18.

In the thus configured information system according to the fourth embodiment, the acquisition of an image containing the measurement target X performed by the spectrometry section 10, the checking of an image on the external display section 18 performed by the operator, and the setting of a condition for identifying the measurement target X and other types of operation performed by the smartphone 1 can be performed independently of one another, whereby the operability of the information system can be improved.

Further, installing application software on the smartphone 1 and connecting the smartphone 1 to the spectrometry section 10 and the external display section 18 allow use of the information system according to the present disclosure, whereby excellent versatility is achieved because the smartphone 1 including no spectrometry section 10 can be used.

Moreover, employing the configuration in which the smartphone 1, the spectrometry section 10, and the external display section 18 complete the information system according to the present disclosure allows use of the information system off line except communication among the smartphone 1, the spectrometry section 10, and the external display section 18, whereby the information system can be used at a location where the communication status is unstable.

Examples of the external display section 18 may include a mobile notebook PC, a tablet terminal, a head-up display (HUD), and a head mounted display (HMD). Among them, external display section 18 is preferably a head mounted display. A head mounted display allows, for example, the result of the identification of the measurement target X, the position where the measurement target X is expected to be present, and the like to be displayed in the form of augmented reality (AR) and further allows hands-free use of the information system, whereby the operability of the information system can be further improved.

The thus configured information system according to the fourth embodiment also provides the same effects as those provided by the first embodiment described above.

The present embodiment has been described with reference to the case where the information system according to the present disclosure includes the smartphone 1 as an information terminal, the spectrometry section 10 as a spectroscopic camera, and the external display section 18, such as a head mounted display. The information system according to the present disclosure may instead be so configured that the smartphone 1 is replaced, for example, with a table terminal as the information terminal or that the smartphone 1, that is, the information terminal may be replaced, for example, with a server.

Further, the present embodiment has been presented with reference to the case where the spectrometry section and the external display section 18 are components separate from each other, as shown in FIG. 13, but not necessarily, and the spectrometry section 10 and the external display section 18 may be integrated with each other.

Fifth Embodiment

A fifth embodiment of the information system according to the present disclosure will next be described.

Figure 14:
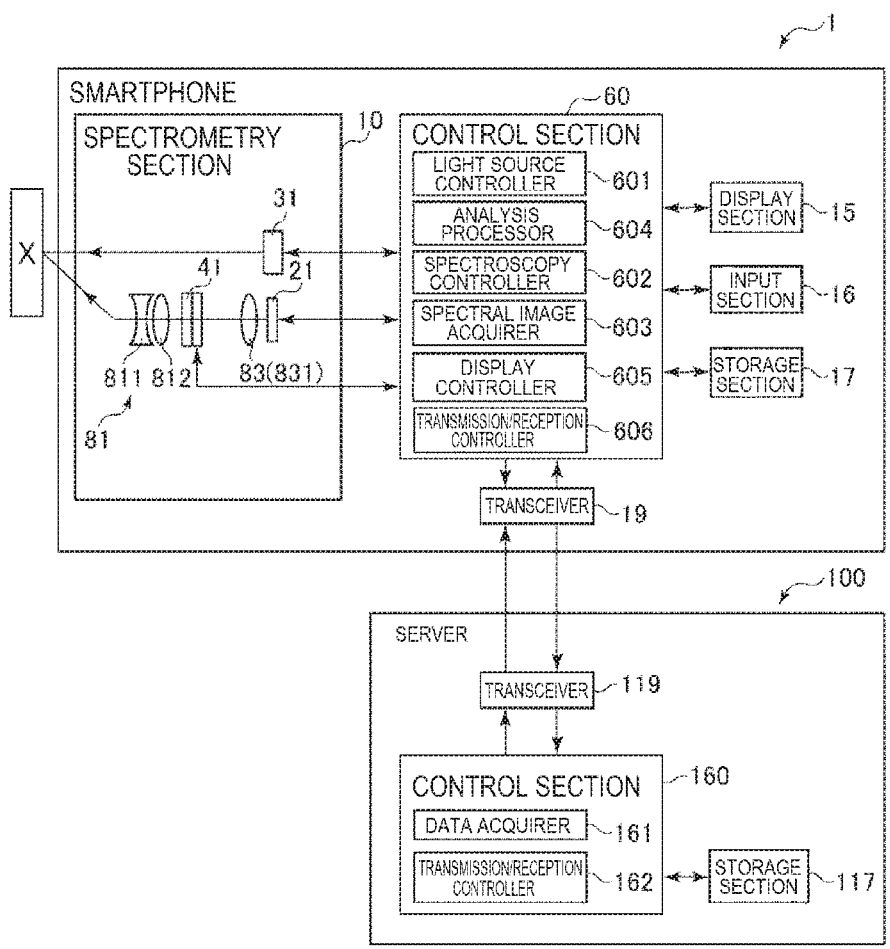
FIG. 14 is a block diagram showing a schematic configuration of a smartphone and a server to which a fifth embodiment of the information system according to the present disclosure is applied.

FIG. 14 is a block diagram showing a schematic configuration of a smartphone and a server to which the fifth embodiment of the information system according to the present disclosure is applied.

The information system according to the fifth embodiment will be described below primarily on differences from the information system according to the first embodiment described above, and the same items as those in the first embodiment will not be described.

The information system according to the fifth embodiment shown in FIG. 14 is the same as the information system according to the first embodiment described above except that a server 100 is independently provided in addition to the smartphone 1 as an information terminal. That is, in the information system according to the fifth embodiment, the smartphone 1, which is an information terminal, by itself does not complete the information system according to the present disclosure, which includes the smartphone 1 as an information terminal and the server 100.

In the information system according to the fifth embodiment, the smartphone 1 further includes a transceiver 19, and the control section 60 includes a transmission/reception controller 606, which controls the action of the transceiver 19, as shown in FIG. 14.

The server 100 includes a storage section 117, a transceiver 119, and a control section 160, and the control section 160 includes a data acquirer 161 and a transmission/reception controller 162, which control the storage section 117 and the transceiver 119, respectively.

In the thus configured information system according to the present embodiment, the storage section 17 provided in the smartphone 1 does not store the database for identifying the measurement target X, and the storage section 117 provided in the sever 100 instead stores the database.

The transceiver 19 provided in the smartphone 1 transmits and receives the database to and from the transceiver 119 provided in the server 100 and vice versa. That is, the transceiver 19 transmits a request of acquisition of the database from the storage section 117 to the transceiver 119 and receives the database from the server 100 via the transceiver 119. The transceiver 119 receives the request of acquisition of the database from the storage section 117 via the transceiver 19 and transmits the database to the smartphone 1 via the transceiver 19. The transmission and reception of the database from and to the transceiver 19 and the transmission and reception of the database from and to the transceiver 119 may be performed via a wire or wirelessly, and in the case of wireless transmission and reception, the transmission and reception may be performed via the Internet.

The transmission/reception controller 606 provided in the controller 60 of the smartphone 1 controls the action of the transceiver 19 to receive the database from the server 100 via the transceiver 119, and the analysis processor 604 receives the database from the transmission/reception controller 606 and identifies the measurement target X based on the database.

Further, the data acquirer 161 provided in the control section 160 of the server 100 acquires the database stored in the storage section 117 in response to the acquisition request and then transmits the database to the transmission/reception controller 162. The transmission/reception controller 162 then controls the action of the transceiver 119 to transmit the database from the server 100 to the smartphone 1 via the transceiver 19.

In the thus configured information system according to the fifth embodiment, the smartphone 1, which is an information terminal, by itself does not complete the information system, which further includes the server 100, and the storage section 117 provided in the server 100 saves the database and transmits the database to the smartphone 1 via the transceivers 19 and 119 when the database is used to identify the measurement target X. The configuration described above provides an advantage of no need to cause the storage section 17 provided in the smartphone 1 to store a large amount of data. Further, when the information system includes a plurality of smartphones 1, the database can be shared by the plurality of smartphones 1. Moreover, only updating the database stored in the storage section 117 of the server 100 keeps the database used by each of the smartphones 1 updated accordingly.

Further, in the information system according to the present disclosure, to cause the smartphone 1 to identify the measurement target X off line, the necessary database may be transferred from the storage section 117 provided in the server 100 to the storage section 17 provided in the smartphone 1. The smartphone 1 can therefore identify the measurement target X even when operating off line.

The thus configured information system according to the fifth embodiment also provides the same effects as those provided by the first embodiment described above.

The present embodiment has been described with reference to the case where the information system according to the present disclosure includes the smartphone 1 as an information terminal and the server 100. The information system according to the present disclosure may instead be so configured that the information terminal is formed, for example, of a table terminal in place of the smartphone 1 or that the smartphone 1, that is, the information terminal may be formed, for example, of a digital camera, a digital video recorder, a head-up display (HUD), or a head mounted display (HMD).

Further, in the present embodiment, the control section 60 provided in the smartphone 1 includes the light source controller 601, the spectroscopy controller 602, the spectral image acquirer 603, the analysis processor 604, and the display controller 605, as in the first embodiment described above, and at least one of the components described above may be provided in the control section 160 provided in the server 100.

Sixth Embodiment

A sixth embodiment of the information system according to the present disclosure will next be described.

Figure 15:
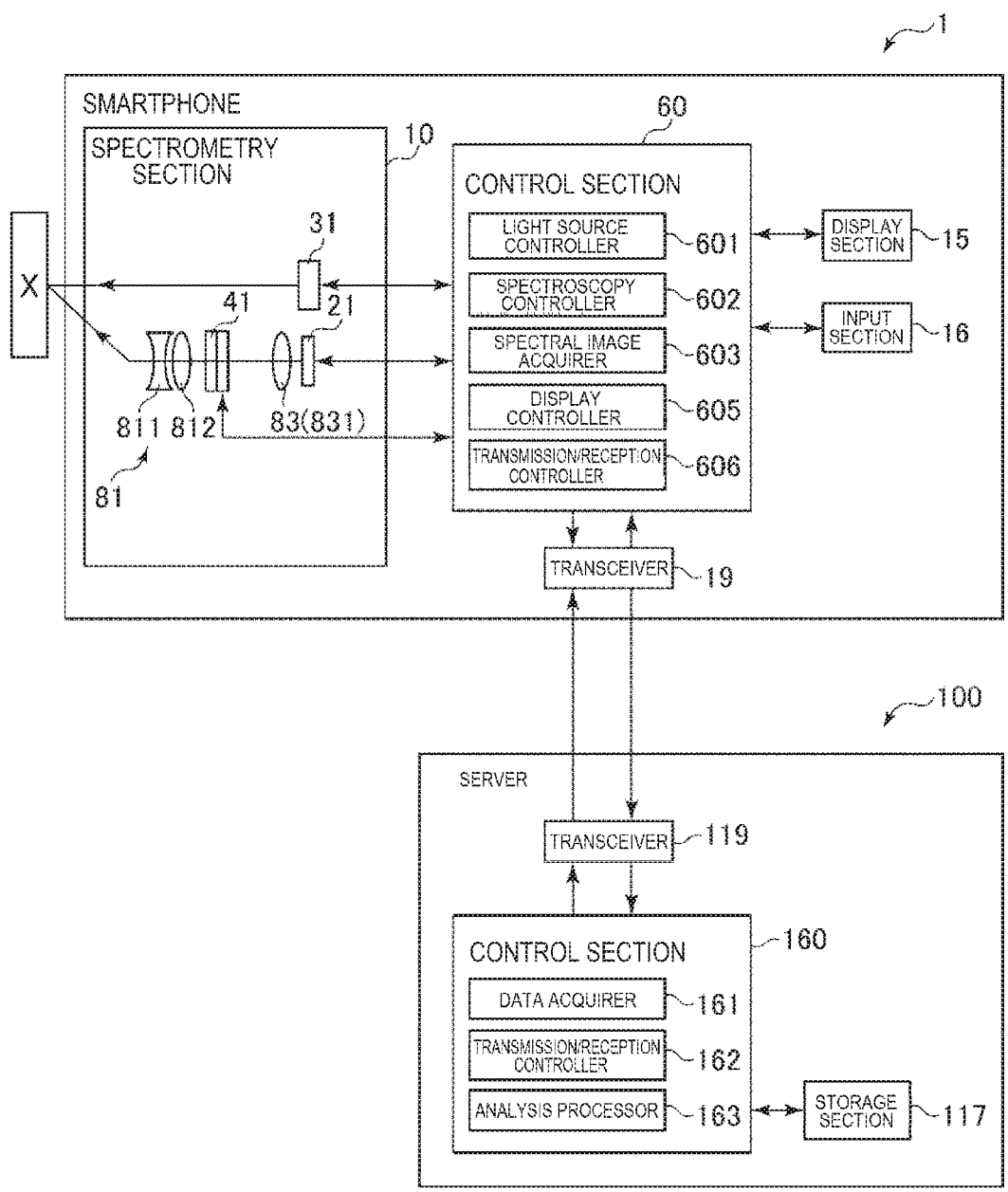
FIG. 15 is a block diagram showing a schematic configuration of a smartphone and a server to which a sixth embodiment of the information system according to the present disclosure is applied.

FIG. 15 is a block diagram showing a schematic configuration of a smartphone and a server to which the sixth embodiment of the information system according to the present disclosure is applied.

The information system according to the sixth embodiment will be described below primarily on differences from the information system according to the first embodiment described above, and the same items as those in the first embodiment will not be described.

The information system according to the sixth embodiment shown in FIG. 15 is the same as the information system according to first embodiment described above except that the server 100 is independently provided in addition to the smartphone 1 as an information terminal. That is, in the information system according to the sixth embodiment, the smartphone 1, which is an information terminal, by itself does not complete the information system according to the present disclosure, which includes the smartphone 1 as an information terminal and the server 100.

In the information system according to the sixth embodiment, the smartphone 1 includes no storage section or no analysis processor in the control section 60, as shown in FIG. 15. In contrast, the smartphone 1 further includes the transceiver 19, and the control section 60 includes the transmission/reception controller 606, which controls the action of the transceiver 19.

The server 100 further includes the storage section 117, the transceiver 119, and the control section 160, and the control section 160 includes the data acquirer 161 and the transmission/reception controller 162, which control the actions of the storage section 117 and the transceiver 119, respectively, and an analysis processor 163, which identifies the measurement target X.

In the thus configured information system according to the present embodiment, the smartphone 1 includes no storage section, and the server 100 instead includes the storage section 117. The storage section 117 stores a variety of data as does the storage section 17 provided in the smartphone 1 according to the first embodiment described above.

The control section 60 provided in the smartphone 1 includes no analysis processor, and the control section 160 provided in the server 100 instead includes the analysis processor 163. The analysis processor 163 compares the optical spectrum, that is, the spectral information associated with the measurement target X with the database to identify the measurement target X, as does the analysis processor 604 provided in the smartphone 1 according to the first embodiment described above.

The transceiver 19 provided in the smartphone 1 transmits and receives the various data to and from the transceiver 119 provided in the server 100 and vice versa. Specifically, for example, the transceiver 19 transmits the spectral information, that is, the optical spectrum specific to the measurement target X acquired by the smartphone 1 to the transceiver 119 and receives the result of the identification of the measurement target X from the server 100 via the transceiver 119. The transceiver 119 receives the spectral information, that is, the optical spectrum specific to the measurement target X acquired by the smartphone 1 from the smartphone 1 via the transceiver 19 and transmits the result of the identification of the measurement target X to the smartphone 1 via the transceiver 19. The transmission and reception of a variety of data from and to the transceiver 19 and the transmission and reception of the variety of data from and to the transceiver 119 may be performed via a wire or wirelessly, and in the case of wireless transmission and reception, the transmission and reception may be performed via the Internet.

The transmission/reception controller 606 provided in the control section 60 of the smartphone 1 controls the action of the transceiver 19 to transmit the optical spectrum, that is, the spectral information acquired by the spectral image acquirer 603 and associated with the measurement target X to the analysis processor 163 provided in the serves 100 via the transceiver 119. The analysis processor 163 then controls the action of the data acquirer 161 to acquire the database stored in the storage section 117 and then compares the spectral information with the database to identify the measurement target X.

Further, the transmission/reception controller 162 provided in the control section 160 of the server 100 controls the action of the transceiver 119 to transmit the result of the identification of the measurement target X performed by the analysis processor 163 from the server 100 to the smartphone 1 via the transceiver 19.

In the thus configured information system according to the sixth embodiment, the smartphone 1, which is an information terminal, by itself does not complete the information system, which further includes the server 100, and the storage section 117 provided in the server 100 saves the database. The analysis processor 163 provided in the server 100 then identifies the measurement target X based on the database and then transmits the result of the identification of the measurement target X to the smartphone via the transceivers 19 and 119. The configuration described above advantageously eliminates the need to store a large amount of data in the storage section provided in the smartphone 1 and further eliminates the need to exert a large calculation burden on the smartphone 1. Moreover, increasing the processing performance of the analysis processor 163 and storing more detailed information in the database in the storage section 117 allow identification of the measurement target X with higher accuracy.

When the information system includes a plurality of smartphones 1, the database can be shared by the plurality of smartphones 1. Further, only updating the database stored in the storage section 117 of the server 100 keeps the database used by each of the smartphones 1 updated accordingly.

The thus configured information system according to the sixth embodiment also provides the same effects as those provided by the first embodiment described above.

The present embodiment has been described with reference to the case where the information system according to the present disclosure includes the smartphone 1 as an information terminal and the server 100. The information system according to the present disclosure may instead be so configured that the information terminal is formed, for example, of a table terminal in place of the smartphone 1 or that the smartphone 1, that is, the information terminal may be formed, for example, of a digital camera, a digital video recorder, a head-up display (HUD), or a head mounted display (HMD).

Further, in the present embodiment, the control section 60 provided in the smartphone 1 includes the light source controller 601, the spectroscopy controller 602, the spectral image acquirer 603, and the display controller 605, as in the first embodiment described above, and at least one of the components described above may be provided in the control section 160 provided in the server 100.

The information system and the identification method according to the present disclosure have been described based on the embodiments shown in the drawings, but the present disclosure is not limited thereto.

For example, in the information system according to the present disclosure, each configuration can be replaced with an arbitrary configuration that provides the same function. Further, an arbitrarily configuration can be added to each configuration in the information system according to the present disclosure.

In the information system according to the present disclosure, arbitrary two or more configurations shown in the first to sixth embodiments described above may be combined with each other.

Further, an arbitrary step may be added to the identification method according to the present disclosure.

What is claimed is:

1. An information system comprising:
    an input device configured to receive a condition for acquiring spectral information specific to a target;
    a spectrometry camera configured to repeatedly selectively receive a specific wavelength of light one wavelength at a time so as to capture a plurality of images of the target, the captured plurality of images representing a plurality of wavelengths;
    a memory configured to store a program and a database containing a plurality of pieces of the spectral information corresponding to a plurality of objects, each of the plurality of objects having the plurality of pieces of the spectral information, the database including a first wavelength range corresponding to a first object of the plurality of objects, the target belonging in the first object; and
    a processor configured to execute the program so as to:
        determine whether the condition, which is received via the input device, includes selection of the first object;
        cause the spectrometry camera to repeatedly selectively receive the specific wavelength of light one wavelength at a time, the specific wavelength being selected from only the first wavelength range so as to capture a first plurality of images of the plurality of images when the condition is determined to include the selection of the first object;
        identify the spectral information of the captured first plurality of images;
        compare the identified spectral information with the spectral information corresponding to the first object in the database and provide a comparison result; and
        identify the target based on the comparison result.

2. The information system according to claim 1,
    wherein the database includes a second wavelength range corresponding to the first object, the first wavelength range more closely relates to the first object than the second wavelength range,
    after the processor causes the spectrometry camera to repeatedly selectively receive the specific wavelength that is selected from the first wavelength range, the processor causes the spectrometry camera to repeatedly selectively receive the specific wavelength that is selected from the second wavelength range so as to capture a second plurality of images of the plurality of images, and
    the processor is further configured to:
        identify the spectral information of the captures second plurality of images;
        compare the identifies spectral information of the captures second plurality of images with the spectral information corresponding to the first object in the database and provide another comparison result; and
        identify the target based on the comparison result and the another comparison result.

3. The information system according to claim 1,
    wherein the processor is configured to detect a relative movement of the target with respect to the spectrometry camera, and
    when the processor detects the relative movement, the processor is configured to terminate an operation of the spectrometry camera.

4. The information system according to claim 1, further comprising:
    a display configured to display information relating to the identified target.

5. The information system according to claim 4,
    wherein the processor identifies a type of the target and displays at least one of an image of the identified target, the type of the identified target, and a detailed description of the identified target on the display.

6. The information system according to claim 4,
    wherein the processor is further configured to:
        identify presence or absence of the target and a position of the target in an image capturing region of the spectrometry camera; and
        display the identified presence or absence of the target and the identified positon of the target on the display.

7. The information system according to claim 4,
    wherein the processor is configured to identify genuineness of the target and display whether or not the target is a genuine article on the display.

8. The information system according to claim 4,
    wherein the processor is configured to identify a degree of degradation of the target and display the degree of degradation of the target on the display.

9. The information system according to claim 1,
    wherein the information system is configured with an information terminal device.

10. The information system according to claim 1,
    wherein the information system is configured with an information terminal device and the spectroscopic camera, and the spectroscopic camera is separately provided from the information terminal device, and
    the information terminal device includes the processor and the memory.

11. The information system according to claim 1, further comprising:
    a display configured to display the identified target,
    wherein the information system is configured with an information terminal device, and information terminal device includes the spectrometry camera, the memory, and the processor, and
    the display is separately provided from the information terminal device.

12. The information system according to claim 1,
    wherein the information system is configured with an information terminal device and a server,
    the information terminal device includes the spectrometry camera and the processor, and
    the server includes the memory.

13. The information system according to claim 1,
    wherein the information system is configured with an information terminal device and a server,
    the information terminal device includes the spectrometry camera and the one part of the processor, and
    the server includes the memory and another part of the processor.

14. An identification method for causing a processor to execute a process, the method comprising executing on the processor the steps of:
    receiving a condition for acquiring spectral information specific to a target;
    determine whether the received condition includes selection of a first object of a plurality of objects, the target belonging in the first object, each of the plurality of objects having a plurality of pieces of spectral information;

repeatedly selectively receiving a specific wavelength of light one wavelength at a time, the specific wavelength being selected from only a first wavelength range corresponding to the first object so as to capture a first plurality of images when the condition is determined to include the selection of the first object;

identifying the spectral information of the captured first plurality of images;

comparing the identified spectral information with the spectral information corresponding to the first object in a database and providing a comparison result, the database containing the plurality of pieces of the spectral information corresponding to the plurality of objects; and identifying the target based on the comparison result.

15. A non-transitory computer readable medium embodying computer readable instructions stored thereon for causing a computer to execute a process by a processor so as to perform the steps of:

receiving a condition for acquiring spectral information specific to a target;

determine whether the received condition includes selection of a first object of a plurality of objects, the target belonging in the first object, each of the plurality of objects having a plurality of pieces of spectral information;

repeatedly selectively receiving a specific wavelength of light one wavelength at a time, the specific wavelength being selected from only a first wavelength range corresponding to the first object so as to capture a first plurality of images when the condition is determined to include the selection of the first object;

identifying the spectral information of the captured first plurality of images;

comparing the identified spectral information with the spectral information corresponding to the first object in a database and providing a comparison result, the database containing the plurality of pieces of the spectral information corresponding to the plurality of objects; and identifying the target based on the comparison result.

* * * * *